(12) United States Patent
Stegmaier et al.

(10) Patent No.: US 8,031,629 B2
(45) Date of Patent: Oct. 4, 2011

(54) METHOD AND APPARATUS OF MANAGING WIRELESS COMMUNICATION IN A WORKSITE

(75) Inventors: Peter A. Stegmaier, Uetikon (CH); Klaus Schneider, Dornbirn (CH)

(73) Assignee: Leica Geosystems AG, Heerbrugg (CH)

( * ) Notice: Subject to any disclaimer, the term of this patent is extended or adjusted under 35 U.S.C. 154(b) by 1116 days.

(21) Appl. No.: 10/598,511

(22) PCT Filed: Mar. 4, 2005

(86) PCT No.: PCT/EP2005/050986
§ 371 (c)(1),
(2), (4) Date: Jun. 18, 2007

(87) PCT Pub. No.: WO2005/085968
PCT Pub. Date: Sep. 15, 2005

(65) Prior Publication Data
US 2007/0268852 A1    Nov. 22, 2007

(30) Foreign Application Priority Data
Mar. 4, 2004 (EP) ...................... 0410887

(51) Int. Cl.
*H04Q 7/00* (2006.01)
(52) U.S. Cl. ............................ 370/254; 370/328; 701/50
(58) Field of Classification Search .................. 370/328, 370/254; 455/404, 414.1, 414.2, 404.2; 701/50, 701/213, 55, 56; 340/539.13, 988, 995, 995.11; 172/1–10; 37/348, 382, 414; 180/117, 167
See application file for complete search history.

(56) References Cited

U.S. PATENT DOCUMENTS

| | | | |
|---|---|---|---|
| 4,414,661 A | 11/1983 | Karlstrom | |
| 5,404,661 A | 4/1995 | Sahm et al. | |
| 5,631,658 A * | 5/1997 | Gudat et al. | .................. 342/457 |
| 5,646,844 A * | 7/1997 | Gudat et al. | .................. 701/208 |
| 5,808,907 A * | 9/1998 | Shetty et al. | .................. 702/188 |
| 5,850,341 A | 12/1998 | Fournier et al. | |
| 5,935,192 A | 8/1999 | Henderson et al. | |
| 6,037,901 A * | 3/2000 | Devier et al. | ............ 342/357.17 |
| 6,084,870 A | 7/2000 | Wooten et al. | |
| 6,463,374 B1 | 10/2002 | Keller et al. | |
| 6,611,755 B1 | 8/2003 | Coffee et al. | |
| 6,771,609 B1 * | 8/2004 | Gudat et al. | .................. 370/254 |

OTHER PUBLICATIONS

Yakoh, T, et al: "MACS: An Efficient Multicast Mechanism for Radiopacket Communication Among Multiple Mobile Robots," Communications, Computers and Signal Processing, 1993, IEEE Pacific Rim Conference, IEEE vol. 2, May 19, 1993.

* cited by examiner

*Primary Examiner* — Dwayne Bost
*Assistant Examiner* — Myron Wyche
(74) *Attorney, Agent, or Firm* — Maschoff Gilmore & Israelsen

(57) ABSTRACT

A method of controlling wireless messaging between mobile apparatuses and an onsite office in a worksite, including: dividing the worksite area into elementary cells mapped in correspondence with the topology of the area and into and communication zones, establishing at least one updatable communication attribute value pertaining to a parameter of wireless communication, establishing at least one worksite management attribute value pertaining to a parameter other than a wireless communication parameter of the worksite at that cell, storing values of the worksite and communication attributes, forming a worksite management message with an electronically readable content containing at least one worksite management attribute value, accessing the memory to obtain at least one current communication attribute value, and establishing a wireless communication to or from the communication zone to send or receive the management message on the basis of the current communication attribute value(s) electronically accessed from the memory.

46 Claims, 10 Drawing Sheets

METHOD AND APPARATUS OF MANAGING WIRELESS COMMUNICATION IN A WORKSITE

The present invention relates to the field of worksite management, notably in civil engineering (construction sites, road building, urban development, etc.), landscaping, mining, etc., and aims more particularly at providing a method and apparatus for managing wireless communication of different types of management data that come into play in a worksite project. Worksite projects can be vastly complex and call for a wide variety of information from its initial planning phase to physical completion.

BACKGROUND

To assist in this task, it is known to use computer-aided tools for generating a target land contour for a worksite, based on surveying data of the original contour of the land in question. These tools generate models from which elementary tasks can be e.g. assigned to various items of on-site apparatus, such as earthmoving-apparatus, the latter in some cases being automated to varying degrees. The earthmoving apparatus or its operator needs to be provided at all times with all the necessary information for conducting the task at hand at its location. This information will generally have various possible sources: a central model held at an on-site office, external devices such as beacons, laser guides, onboard sensors, and the like. As the tasks to be performed by an earthmoving apparatus are inextricably linked to its exact physical location, it has become usual practice to provide each item of mobile apparatus with a positioning device such as a GPS receiver and two-way communication links with different stations, or possibly other mobile apparatus on the site.

In this connection, patent document U.S. Pat. No. 5,631,658 discloses a system for automatically operating geography-altering machinery in a worksite on the basis of a pre-established three-dimensional model of the target contour relative to an existing contour. The latter is divided into elementary grid elements which can be indexed with the position of a contour-modifying tool of a particular earthmoving apparatus. A computerised system on board of the earthmoving apparatus stores the site plan, identifies the current position and elevation of the contour-modifying tool using a GPS device, and automatically determines the actions to be performed with that tool to make the existing contour at that local level correspond to the target contour.

In the field of open-cast mining, patent document U.S. Pat. No. 5,850,341 discloses a system for monitoring the removal of ore with reference to a three-dimensional map of the mine. The map is subdivided into elementary regions which are differentiated according to the type or grade of ore they contain, that information being acquired and recorded at an initial phase. The mobile excavating machinery is provided with a GPS receiver for positioning relative to the map and a sensor for detecting the amounts of ore removed. This information is correlated with the data concerning the ore to control the mobile excavating operations and keep track of the excavated ore.

Patent document U.S. Pat. No. 5,935,192 discloses a database technique for identifying and associating information with elementary sections of a worksite. Each section of the worksite is defined by a corresponding data object occupying two dimensions of a layered data organisation. The layers are classed as objects, each associated with a parameter of the worksite. The information is used notably for a differencing algorithm to direct the operations of working machines through an operator display or an automatic controller.

Patent document U.S. Pat. No. 5,404,661 discloses a technique for acquiring the three-dimensional position coordinates of a work tool in relation to a stored model of a worksite. The tool position information is obtained through a GPS in cooperation with a dynamically updatable database.

Patent document U.S. Pat. No. 6,463,374 discloses a technique for guiding agricultural vehicles, especially for obtaining appropriate spraying patterns over areas of complex contours.

SUMMARY

The prior art does not address the problem of wireless communications between different entities in a worksite, which calls for specific considerations. Indeed, a worksite can cover a considerable area over which communications conditions can differ from place to place and as a function of time. Also, the communicating entities—which can be mobile or fixed—may have their own communications parameters or characteristics to take into account.

By contrast, the invention proposes an approach in which fully takes into account the management of wireless communication parameters in the overall management of data relating to a worksite.

More particularly, the invention proposes, according to a first aspect, a method of controlling wireless messaging in a worksite area, in which worksite management messages are received by, or sent from, communicating entities operating within the worksite, comprising the steps of:

dividing at least part of the worksite area into elementary cells mapped in correspondence with the topology of the area, or into such cells and determined communication zones, for a given cell or communication zone of the worksite, establishing at least one communication attribute value pertaining to a parameter of wireless communication to or from the given cell or communication zone, for a given cell, establishing at least one worksite management attribute value of the worksite for the given cell, the worksite management attribute value pertaining to a parameter other than a wireless communication parameter, storing, in a memory, values of the worksite management and communication attributes, each stored attribute value being electronically indexed to the elementary cell, or to the communication zone, for which it was determined, forming a worksite management message with an electronically readable content containing at least one worksite management attribute value, accessing the memory to obtain at least one current communication attribute value in respect of a cell or communication zone to or from which the formed management message is to be communicated by a wireless communication, and establishing a wireless communication to or from the cell or communication zone to send or receive the management message on the basis of the current communication attribute value(s) electronically accessed from the memory.

The memory can be provided as a common resource whose contents are accessible to communicating parties exchanging worksite management messages.

At least one communication attribute can be one of the following attributes:
i) a communication frequency or channel allocation,
ii) a signal strength indicator, indicating a signal strength to use,
iii) a bandwidth capacity indicator,
iv) a detected signal-to-noise ratio,
v) data communication security parameters, such as encryption/decryption codes, keys,
vi) data messaging format information,
vii) data transmission protocol information.

The method can comprise the step of indexing, in the memory, worksite management attributes and communication attributes to a common elementary cell to which they pertain.

The method can further comprise the steps of:
analysing a detected wireless communication signal at a determined elementary cell or communication zone,
determining, on the basis of the analysis, whether a value of a communication attribute of that signal is appropriate under current wireless communication conditions,
if the value of a communication attribute is determined not to be appropriate, sending a message to the memory to cause the value of the communication attribute to be updated to an appropriate value (e.g. to adjust the value of another communication parameter).

The method can further comprise sending a message directly to the source of the detected wireless signal to cause the source to update the value of the communication attribute to an appropriate value (e.g. an increased or decreased signal strength) or to adjust the value of another communication parameter (e.g. a carrier frequency or channel allocation).

For at least one communication attribute, the memory can store a plurality of values indexed as a function of at least one of:
i) a classification of the wireless communication sending party,
ii) a classification of the wireless communication receiving party,
iii) a classification of a worksite management attribute to be conveyed in a worksite management message,
iv) a location of the wireless communication sending party,
v) a location of the wireless communication receiving party.

The method can comprise the step of establishing or maintaining a radio link at a receiving party, with the sub-steps of:
accessing at least one stored communication attribute value, and
automatically configuring receiver means of the receiving party on the basis of (an) accessed communication attribute value(s).

The method can comprise the step of establishing or maintaining a radio link at a transmitting party, with the sub-steps of:
accessing at least one stored communication attribute value, and
automatically configuring transmitter means of the transmitting party on the basis of (an) accessed communication attribute value(s).

A communication attribute can be a radio frequency or channel allocation, for exchanging data with a remote resource, and the method can comprise the step of automatically updating and using the updated radio frequency or channel allocation as a function of communication conditions.

A communication attribute can be signal strength indicator specifying a modulation or carrier signal strength value to use for a transmission in a communication link, and the method can comprise the steps of:
detecting a received signal strength at a receiving party,
determining whether the received signal strength is below a threshold,
in the affirmative, sending a message by the receiving party to correspondingly update the signal strength indicator value in the memory accessible to communicating parties.

A communication attribute can be a bandwidth capacity parameter expressing the bandwidth capacity limit of a given carrier or channel over a given communication link, and the method can comprise the steps of:
determining the current amount of occupied bandwidth of a given communication carrier or channel,
comparing the current amount of occupied bandwidth with the bandwidth capacity limit, indicated by the bandwidth capacity parameter, for that given communication carrier or channel, to determine if a determined saturation criterion is reached,
in the affirmative, sending a message to the memory and/or to communicating parties concerned, requesting to use another carrier or channel.

The stored worksite and communication attribute parameter values can be organised in a three-dimensional matrix of which the first and second dimensions map the topology of the worksite area and define the locations of the elementary cells or communication zones, and the third dimension corresponds to the set of worksite management and communication attribute parameter(s).

An elementary cell can be dimensioned as a function of at least one of:
the variation in contour at the cell,
the variation in contour at the immediate vicinity of the cell,
the rate of variation with respect to position in the value of at least one data to be managed,
the type of tool(s) scheduled to operate in the area occupied by the elementary cell.

Dimensions of elementary cells can be variable over the worksite area.

Communication attribute and/or worksite management attribute values can be acquired and communicated and/or stored by mobile apparatus as they are conducting site modifying tasks on the worksite.

The method can comprise the steps of:
interrogating at least one source of dynamically updatable data, on board mobile apparatus active on the worksite, capable of delivering at least one current attribute parameter value for a communication attribute and/or for a worksite management attribute,
determining the geographical location at which the current value(s) is/are acquired, and
storing the attribute parameter value(s) acquired at the interrogating step, in association with the cell or communication zoned corresponding to the determined geographical location, as an updated communication attribute and/or a worksite management attribute parameter value.

An updated communication attribute and/or worksite management attribute value can be sent to a remote data management resource for dynamically updating the stored data values by the steps of:
forming a message containing the communication attribute and/or a worksite management attribute parameter value(s) and the geographical location data, and
sending the message to the remote data management resource.

The method can comprise the steps of:
interrogating at least one source of dynamically updatable data on board the mobile apparatus, capable of delivering at least one current communication attribute and/or worksite management attribute parameter value,
determining the geographical location at which the current value(s) is/are acquired,
associating and locally storing the current communication attribute and/or worksite management attribute parameter value(s) and the geographical location data on board the mobile apparatus.

The method can further comprise the step of uploading the communication attribute and/or a worksite management attribute parameter value(s) and the geographical location data from the mobile apparatus to a remote data management resource at a determined updating moment.

The value(s) of at least one of the communication attribute and/or worksite management attributes can be dynamically updatable, and acquired and communicated on-the-fly by, and as, a mobile apparatus performing worksite modifying tasks evolves over the worksite area.

At least one worksite management attribute can relate to physical or chemical material characteristics of the worksite and/or physical or chemical atmospheric characteristics of the worksite.

At least one worksite management attribute parameter value can inferred from operating parameters of a site-modifying apparatus operative in the worksite area.

At least one worksite management attribute value can be established prior to site modifying operations on the worksite and relate to a non-dynamic land characteristic of the worksite.

At least one worksite management attribute value can be established prior to site modifying operations on the worksite and relate to operating characteristics of mobile apparatus.

At least one worksite management attribute value can established prior to site modifying operations on the worksite and relates to legal, administrative, or contractual data associated to the worksite.

At least one worksite management attribute can relate to a reference level, its value for a cell expressing reference level value with respect to which elevation/depth values are established for that cell.

The method can further comprise the step of preparing an individualised dataset specific to an identified site-modifying mobile apparatus, the individualised dataset comprising selected communication attribute and/or a worksite management attribute parameter values for the requirements of that site-modifying mobile apparatus.

The individualised dataset can relate only to cells of a region of the worksite where the site-modifying apparatus is programmed to be present over a determined time window.

In another aspect, there is proposed method of managing data relating to a worksite area, comprising the steps of:
at an initial phase, establishing a set of at least one attribute parameter pertaining to an attribute of the worksite, the attribute parameter having an attribute parameter value susceptible of varying as a function of position in the area,
subdividing the area into elementary cells mapped in correspondence with the topology of the area,
for at least one the elementary cell, determining the attribute parameter value at that elementary cell of at least one attribute parameter,
storing attribute parameter values, each stored attribute parameter value being indexed to the elementary cell for which it was determined,
determining evolutions in attribute parameter values, and
dynamically updating the stored attribute parameter values on the basis of the determined evolutions.

The attribute parameter can express verified data or plausible data concerning an existing state of the worksite. An example of plausible data arises when the attribute parameter relates to a quantity that may have evolved and changed with time, so that it is not verified for the actual existing state of the site. For instance, the attribute data parameter can be the position of a cavity or conduit detected or created in the past, and kept on record. It may then remain plausible that the cavity is still present, but at a slightly different position, or partially filled owing to land movement. Another example is where the parameter was detected/measured with apparatus known to be subject to systematic or random error.

The stored attribute parameter values can be organised in a three-dimensional matrix of which the first and second dimensions map the topology of the worksite area and define the locations of the elementary cells, and the third dimension corresponds to the set of attribute parameter(s).

An elementary cell can be dimensioned as a function of at least one of:
the variation in contour at the cell,
the variation in contour at the immediate vicinity of the cell,
the rate of variation with respect to position in the value of at least one data to be managed,
the type of tool(s) scheduled to operate in the area occupied by the elementary cell.

An elementary cell can, moreover, be dimensioned to be smaller than the footprint of a tool scheduled to operate in the area occupied by the elementary cell, whereby an attribute parameter value relevant for the operation of the tool can be obtained with a determined degree of accuracy.

Dimensions of elementary cells are variable over the worksite area.

An attribute parameter can relate to elementary cell dimensions, expressed by the attribute parameter value(s) of that attribute parameter.

A given area can be covered by more than one elementary cell, each having assigned thereto respective and complementary attribute data. This allows to chose optimum elementary cell size as a function to specific attribute data parameters to which they are associated. The cells covering a given point in the area can then be considered to form a whole, equivalent to a single cell covering that point and comprising all the attributes of those multiple cells.

Attribute parameter values can acquired and communicated and/or stored by mobile apparatus as they are conducting site modifying tasks on the worksite.

The data to be managed can be acquired and communicated and/or stored by mobile apparatus moving on the worksite specifically for acquiring and communicating and/or storing the attribute parameter value(s).

The method can comprise the steps of:
interrogating at least one source of dynamically updatable data on board the mobile apparatus, capable of delivering at least one current attribute parameter value,
determining the geographical location at which the current value(s) is/are acquired, and
storing the attribute parameter value(s) acquired at the interrogating step, in association with the cell corresponding to the determined geographical location, as an updated attribute parameter value.

The updated parameter value can be sent to a remote data management resource for dynamically updating the stored data values by the steps of:
forming a message containing the attribute parameter value(s) and the geographical location data, and
sending the message to the remote data management resource. The message forming and sending steps can be performed on board the mobile apparatus.

The method can comprise the steps of:
interrogating at least one source of dynamically updatable data on board the mobile apparatus, capable of delivering at least one current attribute parameter value,
determining the geographical location at which the current value(s) is/are acquired,
associating and locally storing the current attribute parameter value(s) and the geographical location data on board the mobile apparatus.

The method can further comprise the step of uploading the attribute parameter value(s) and the geographical location data from the mobile apparatus to a remote data management resource at a determined updating moment.

The dynamically updatable attribute parameter value(s) can be acquired and communicated on-the-fly as the mobile apparatus evolves over the area.

The data to be managed can relate to physical or chemical characteristics of the worksite and/or physical or chemical atmospheric characteristics of the worksite.

The data to be managed can comprise at least one of the following types of data for the region occupied by a cell:
ground humidity,
ambient air humidity,
ground temperature,
ambient air temperature,
ground density,
outgassing characteristics,
chemical or physical composition data of material,
mechanical characteristic data of material,
optical characteristics of material, e.g. colour, reflectivity,
qualitative information on at least one operation to be carried out, e.g. a cut or fill indication.

At least one dynamically updated attribute parameter value can be acquired by a sensor specifically provided for sensing that attribute parameter.

At least one dynamically updated attribute parameter value can be inferred from operating parameters of a site-modifying apparatus operative in the worksite area.

The attribute parameter value(s) can further comprise at least one attribute parameter value established prior to site modifying operations on the worksite.

At least one attribute parameter value established prior to site modifying operations on the worksite can relate to a non-dynamic land characteristic of the worksite.

At least one attribute parameter value established prior to site modifying operations on the worksite can comprise at least one of:
soil type,
land composition at a specified depth or depth range,
possible existence of a buried conduit,
indication of the type of buried conduit,
possible existence of an underground cavity,
indication of the type of underground cavity,
recorded or supposed position of a buried conduit or underground cavity (e.g. depth, position within cell, etc.).

At least one attribute parameter value established prior to site modifying operations on the worksite can relate to operating characteristics of the mobile apparatus.

At least one data value established prior to site modifying operations on the worksite can relate to legal, administrative, or contractual data associated to the worksite.

The legal, administrative, or contractual data can relate to at least one of:
land ownership,
insurance coverage,
assigned contractor,
task cost,
task priority,
legal status,
possible existence of a toxic hazard,
indication of archaeological interest.

As explained above, an attribute parameter can also be a communications parameter, e.g. radio frequency, for exchanging data with a remote resource.

At least one attribute parameter can relate to a reference level, its attribute parameter value for a cell expressing reference level value with respect to which elevation/depth values are established for that cell.

The method can further comprise the step of preparing an individualised dataset specific to an identified site-modifying mobile apparatus, the individualised dataset comprising selected attribute parameter values for the requirements of that site-modifying mobile apparatus.

The individualised dataset can relate only to cells at, and in the immediate vicinity of, the site-modifying apparatus at a current geographical location of the latter.

The individualised dataset can relate only to cells of a region of the worksite where the site-modifying apparatus is programmed to be present over a determined time window.

The individualised dataset can relate only to attribute parameter data, among the stored attribute parameter values, which are relevant to the site-modifying apparatus.

The attribute parameter values can be centralised at a main database.

The attribute parameter values can also be distributed over plural distributed databases.

According to another aspect, the invention relates to a system for controlling wireless messaging in a worksite area, in which worksite management messages are received by, or sent from, communicating entities operating within the worksite, at least part of the worksite area being divided into elementary cells mapped in correspondence with the topology of said area or being divided into such cells and determined communication zones, the system comprising:
means for establishing, for a given cell or communication zone of the worksite, at least one communication attribute value pertaining to a parameter of wireless communication to or from the given cell or communication zone,
means for establishing, for a given elementary cell, at least one worksite management attribute value of the worksite for the given cell, the worksite management attribute value pertaining to a parameter other than a wireless communication parameter,
memory means for storing values of the worksite management and communication attributes, each stored attribute value being electronically indexed to the elementary cell, or to the communication zone, for which it was determined,
means for forming a worksite management message with an electronically readable content containing at least one worksite management attribute value,
means for accessing the memory to obtain at least one current communication attribute value in respect of a cell or communication zone to or from which the formed management message is to be communicated by a wireless communication, and means for establishing a wireless communication to or from the cell or communication zone to send or receive the management message on the basis of the current communication attribute value(s) electronically accessed from the memory.

According to a yet another aspect, there is provided an apparatus for managing data relating to a worksite area comprising:

means, operative at an initial phase, for establishing a set of at least one attribute parameter pertaining to an attribute of the worksite, the attribute parameter having an attribute parameter value susceptible of varying as a function of position in the area, mapping means storing a set of elementary cells which subdivide the area in correspondence with the topology of the area, means for determining the attribute parameter value at that elementary cell, for at least one attribute parameter, storage means for storing attribute parameter values, each stored attribute parameter value being indexed to the elementary cell for which it is determined, means for determining evolutions in attribute parameter values, and means for dynamically updating the stored attribute parameter values on the basis of the determined evolutions.

The optional characteristics presented above in relation to the method according to the first aspects are applicable mutatis mutandis to the above apparatus, and vice versa.

The apparatus can further comprise means for acquiring the attribute parameter value(s), the means being at least one of:

a total station type of surveying device,
an aerial view sensor,
a GPS (global positioning by satellite) device,
An LPS (local positioning system).

The apparatus can further comprise data filtering means for selecting, from the stored attribute parameter values, those items of information relevant to at least one of:

selected cells,
selected site-modifying apparatus,
selected tasks on the worksite, and means for sending the filtered information to targeted recipients.

The optional aspects presented in connection with the method according to any of the above aspects can be transposed mutatis mutandis to the above apparatus.

According to a further aspect, the invention relates to a data base comprising a single storage unit or distributed storage units, containing attribute parameter values, the attribute parameter values being prepared specifically for the execution of the method according to the first aspect or any other aspect.

According to a yet another aspect, the invention relates a storage medium containing an individualised dataset specific to an identified site-modifying mobile apparatus, the individualised dataset being prepared specifically for the execution of the method according to the first aspect or any other aspect, and comprising selected data elements of the attribute parameters for the specific requirements of that site-modifying mobile apparatus.

The individualised dataset can relate only to cells at, and in the immediate vicinity of, the site-modifying apparatus at a current geographical location of the latter.

The individualised dataset can relate only to cells of a region of the worksite where the contour-modifying apparatus is programmed to be present over a determined time window.

The individualised dataset can relate only to a/those attribute parameter value(s) among the set managed data, which is/are relevant to the site-modifying apparatus.

According to a further aspect, the invention, the invention relates to a data carrier containing code executable by processor means, to cause the processor means to carry out the method according to the first aspect or any other aspect.

According to yet a further aspect, the invention relates to code executable by processor means, the code causing the processor means to carry out the method according to the first aspect or any other aspect.

BRIEF DESCRIPTION OF THE DRAWINGS

The invention and its advantages shall become more apparent from reading the following description of the preferred embodiments, given surely as non-limiting examples, with reference to the appended drawings in which:

FIGS. 5a and 5b are schematic representations of an elementary cell and its associated attribute data in the virtual space of FIG. 4, in which FIG. 5b is a continuation, starting from the top, of the virtual space interrupted at the bottom of FIG. 5a;

DETAILED DESCRIPTION

Figure 1:
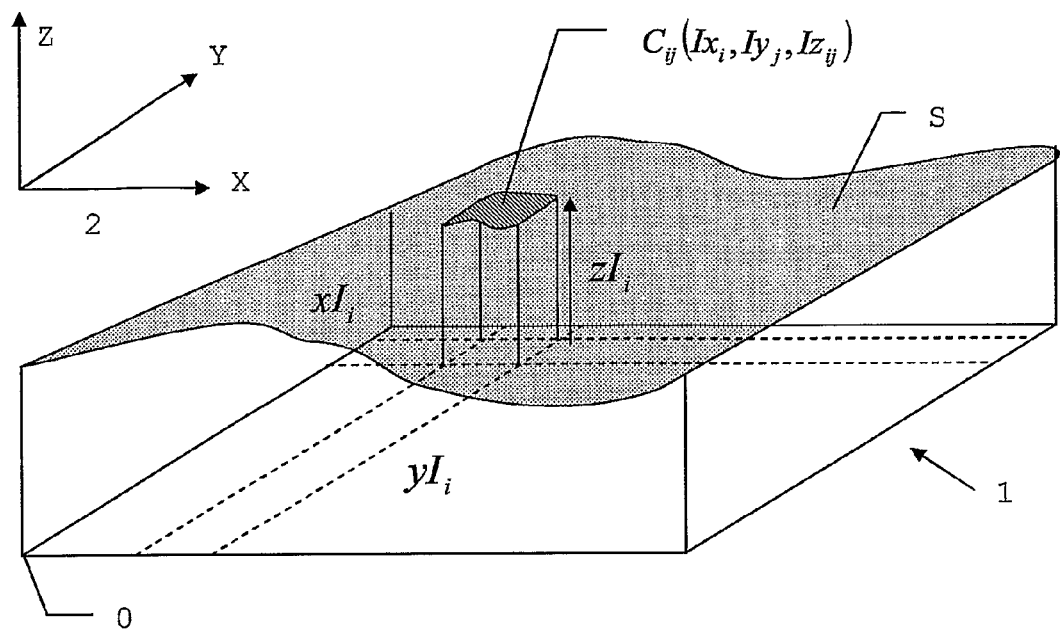
FIG. 1 is a diagram showing the initial three-dimensional contour of part of a worksite, illustrating the position coordinates of an elementary cell $C_{ij}$, taken randomly from the group of elementary cells into which the worksite is decomposed in accordance with an embodiment of the invention.

Referring to FIG. 1, the initial contours of a worksite 1 are acquired using standard surveying techniques to derive a three-dimensional computer readable map. Positions within the worksite are referenced with respect to a point of origin 0 and identified by three coordinate values along respective orthogonal x, y, z axes designated by reference numeral 2 in the figure. The surface S of the initial contour is subdivided into elementary areas, each corresponding to a cell. The figure shows one such cell $C_{ij}$ whose central point has the coordinates $Ix_i$, $Iy_j$, $Iz_{ij}$, where the prefix "I" indicates that these coordinate values correspond to the initial contour of the worksite. The cells can be of uniform size, or they can vary in size over the site.

Figure 2:
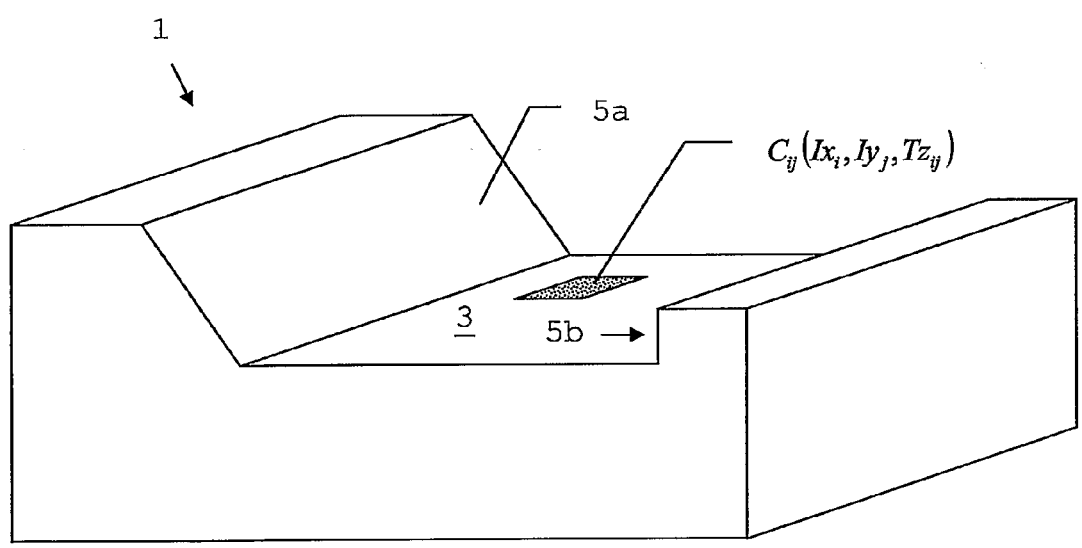
FIG. 2 is a diagram showing the target three-dimensional contour of the same part of the worksite as shown in FIG. 1, illustrating the aforementioned elementary cell $C_{ij}$ with its new position coordinates.

FIG. 2 shows the same portion of the worksite as in FIG. 1 with the contours as they should appear at the conclusion of the earthmoving tasks. This finalised form is hereafter referred to as the "target" contour. In the illustrated example, the section contains a portion of road 3 with raised sides 5a and 5b. The cell $C_{ij}$ of FIG. 1 is shown on this target contour. Being mapped against the same x-y coordinate plane, it retains the same x and y coordinate values $Ix_i$, $Iy_j$, but has a new z coordinate value $Tz_{ij}$, where the letter "T" indicates the target value for that z coordinate. Generally, the x and y coordinate values of any cell (generically designated by the letter C) in the map are invariable between the initial and target contours, while the z coordinate value is likely to differ.

Figure 3:
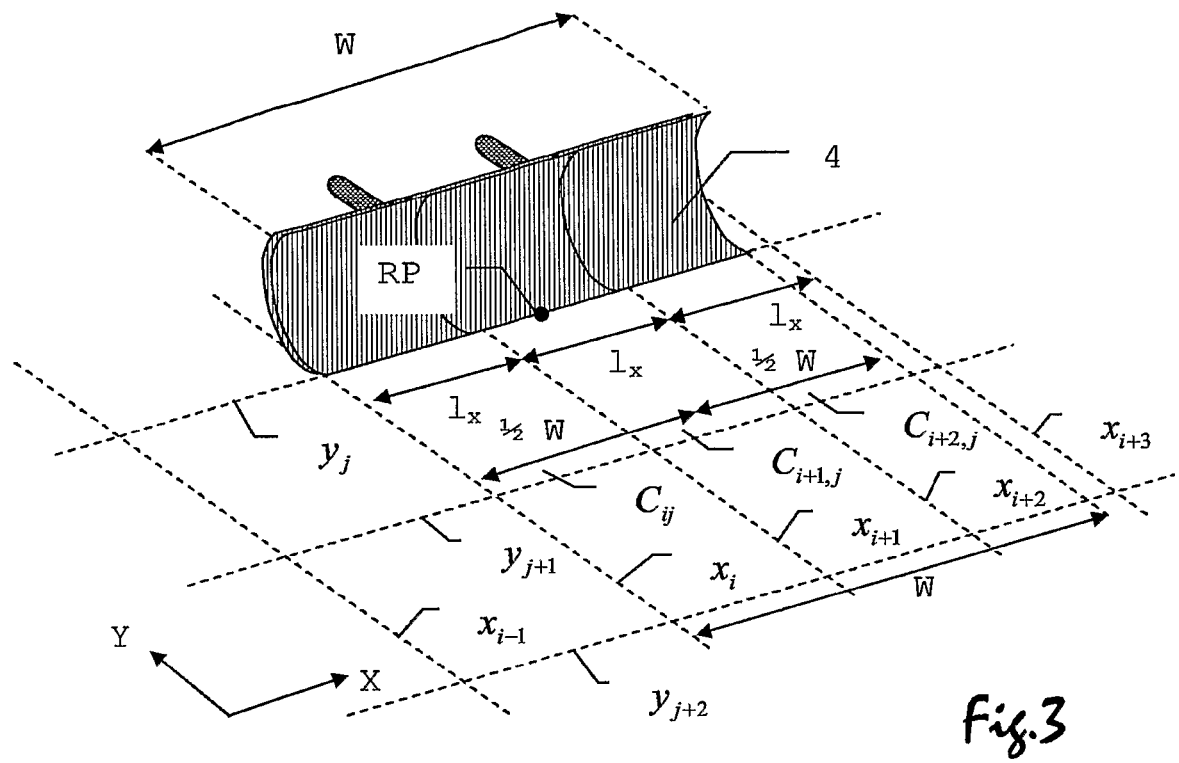
FIG. 3 is a diagram illustrating how an elementary cell is dimensioned relative to the size of a contour-modifying tool used on the worksite, according to an embodiment of the invention.

The dimensions of the elementary cells along the x and y directions are preferably made smaller than the dimensions of a site-modifying tool used on the worksite, at least for cells assigned to attributes relevant to tool commands. This is illustrated by FIG. 3, which shows a blade 4 of a bulldozer having a width W occupying three contiguous elementary cells $C_{ij}$, $C_{(i+1)j}$, $C_{(i+2)j}$, the latter being partially occupied. This relative sizing of the elementary cells C, allows the contour-modifying tool 4 to be positioned accurately with respect to the digital map represented by the set of elementary cells C. The skilled person can determine the appropriate mesh size (pitch of the cells along the x and/or y directions) of the thus-constituted grid according to the positioning accuracy required and the type of contour-modifying tools likely to be used on the site. It is also not necessary to have identical dimensions for each elementary cell. Also, the latter can be square or rectangular, with an arbitrary length/width ratio.

For instance, if the initial contour and target contour of a given portion of the site are such that relatively large contour-modifying tools are expected to be used, then the cell dimensions at that location can be made correspondingly large. Conversely, if finer contour-modifying tools are envisaged for a particular portion of the worksite, or if that portion exhibits pronounced contour variations, then the dimensions of the elementary cells for that portion can be made correspondingly small to achieve the required precision.

In conformity with the present invention, each elementary cell C of the worksite is associated with a set of attribute data, generically designated hereafter by the abbreviation AD. An item of attribute data comprises an attribute parameter value or set of values for a specified attribute parameter.

Figure 4:
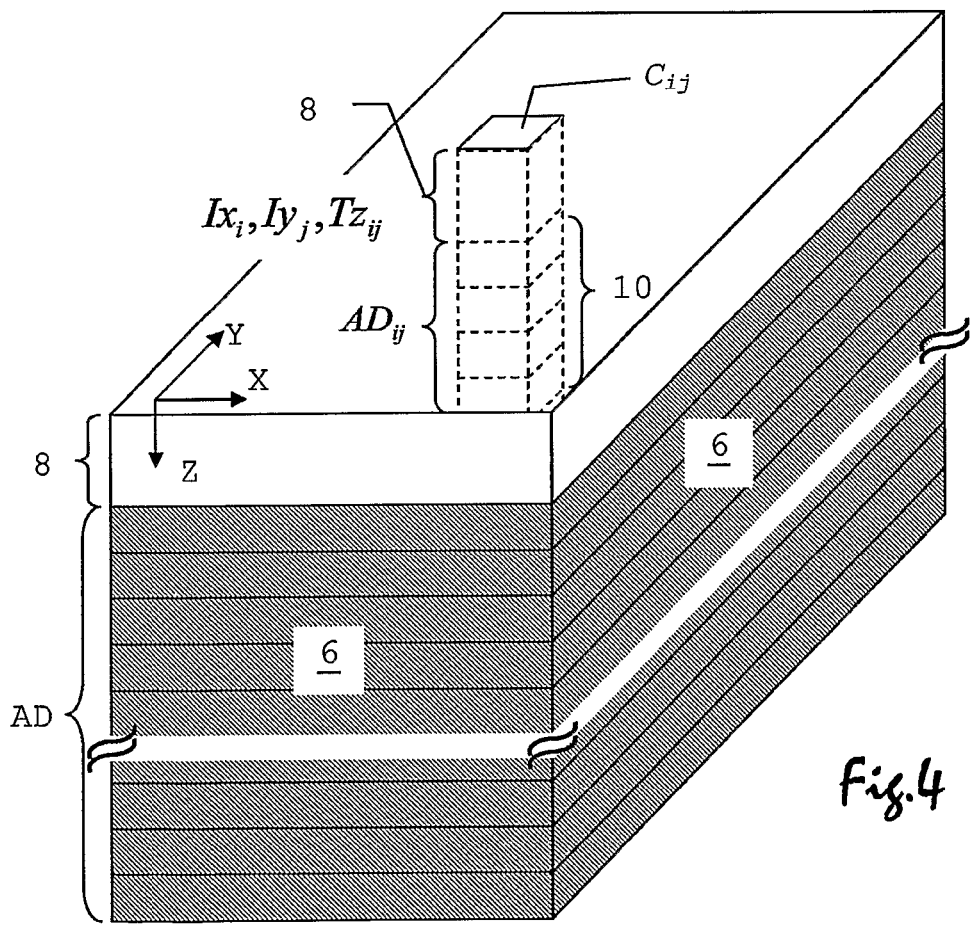
FIG. 4 is a schematic representation of a virtual space for containing attribute data referenced to a two-dimensional x-y plane on which the contour of the worksite is mapped.

As illustrated in FIG. 4, the attribute data AD are contained in an imaginary space referred to as "attribute data space" 6. In the representation used, the attribute data space 6 corresponds to a volume beneath a top layer portion 8 that expresses initial and target contour coordinate values on the x-y plane against which the worksite is mapped (this layer portion 8 shall hereafter be referred to as the "coordinate layer portion"). The AD space 6 effectively defines a three-dimensional matrix, in which two dimensions (x and y dimensions) serve to locate the cells. The attribute parameters are expressed along the third dimension z (vertical). In the representation, each attribute parameter is shown as a respective layer in the AD space 6. The AD parameter values for a given cell are thus the values at the corresponding successive layers along the z direction beneath the x-y coordinates of that cell.

Each elementary cell C thereby has an associated column 10 of attribute data values extending from beneath the coordinate layer portion 8. This is shown in the figure for cell $C_{ij}$, for which the column 10 of AD parameter values is designated $AD_{ij}$.

The top surface of the coordinate layer portion 8, hereafter referred to as the "coordinate data layer", effectively maps the x-y plane of the worksite. This layer portion contains, for each cell:

the x and y coordinates of the corresponding cell (e.g. the centre point coordinates, or position of a predetermined corner), and the target z coordinate value (i.e. the elevation at the conclusion of the earth-moving task) of the corresponding cell.

Thus, for cell $C_{ij}$, the coordinate data layer 8 is composed of a field containing a vector of three numerical entries respectively for the x, y, z coordinate values $x_i$, $y_j$ and $Tz_{ij}$ (the prefix "T" indicates that the value refers to the target z coordinate value). It may also include the initial z-coordinate value $Iz_{ij}$ (cf. FIG. 1).

Figures 5A, 5B:
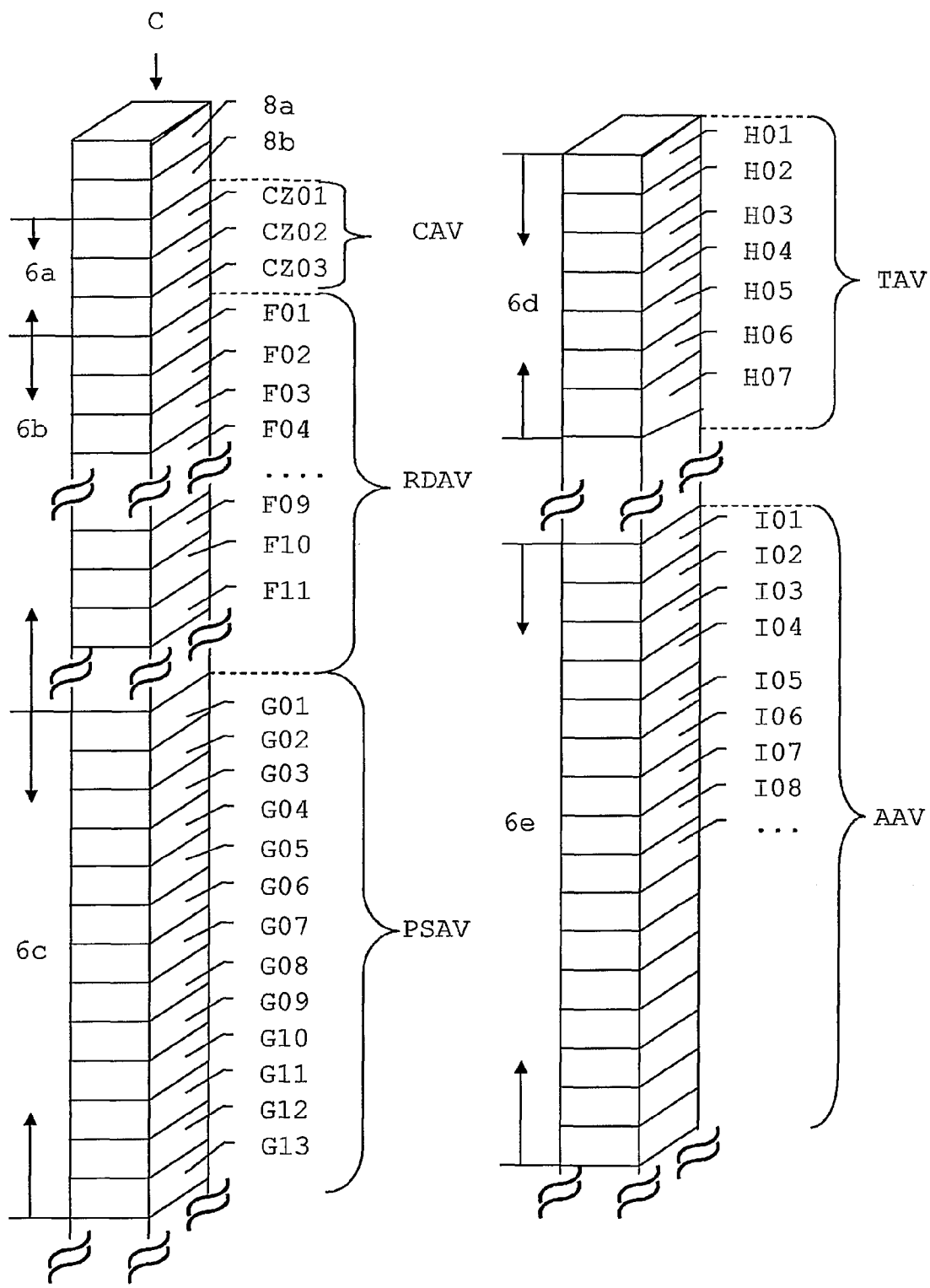

There shall now be described the implementation of attribute parameters associated to the cells. An attribute data parameter is expressed by an attribute parameter value, or set of values, hereafter referred to generally as an attribute data value, or AD value. FIGS. 5a and 5b indicate the types of AD values used in the embodiment to constitute a complete attribute data set. Each AD parameter is assigned to a respective layer in the attribute data space 6. In the figures, these layers are represented for an arbitrary column 10 attached to an elementary cell C. Each layer of the column 10 stores one value or a group (vector) of values of attribute data to be associated to that elementary cell, and which quantify or qualify the corresponding type of attribute. For a given cell, a layer can in some cases be left blank, if its attribute parameter is not relevant or its value is not known for that cell. Where the cells have variable dimensions over the worksite area, the dimensions of the cells can themselves constitute a member of the set of attribute data.

In the example, the AD parameters fall into two classes:

i) wireless communication parameter attributes, which collectively define the data and control settings for establishing and maintaining wireless communications over the worksite and beyond, and which are variable as a function of position and/or time, and ii) worksite management parameter attributes, which include any parameter intervening in connection with worksite task management, excepting the wireless communication parameters of i) above.

The above classification of the attribute data parameters is convenient in that it allows to establish or maintain wireless communication information concerning worksite management and their attributes by referring to the values of the corresponding wireless communication attribute parameters of the cell or communication zone concerned.

In the embodiment, both the worksite management parameter attributes and the wireless communication parameter attributes are mapped on a common system of cells (or group of cells defining a communication zone, as explained further). This enables notably to store, access and manage the attribute data of both classes seamlessly in a common structure. A communication attribute parameter can for instance be updated and handled using the same data management and database commands as for updating and handling a worksite management attribute.

Overall, the attribute data parameters are presented in terms of five different categories: a first category assigned exclusively to the communication parameter attributes (FIG. 5a), and four categories covering the worksite management parameter attributes, the latter being: real-time detected attribute data, pre-surveyed attribute data (FIG. 5a), task attribute data and administrative attribute data (FIG. 5b). Each category of attribute data occupies a number of layers in a respective section of the attribute data space 6, that number corresponding to the number of AD parameters belonging to the category in question. In FIG. 5a, the initial x and y coordinates are designated 8a, and the target z value is designated 8b, these values together forming the coordinate data layer 8.

Figure 8A:
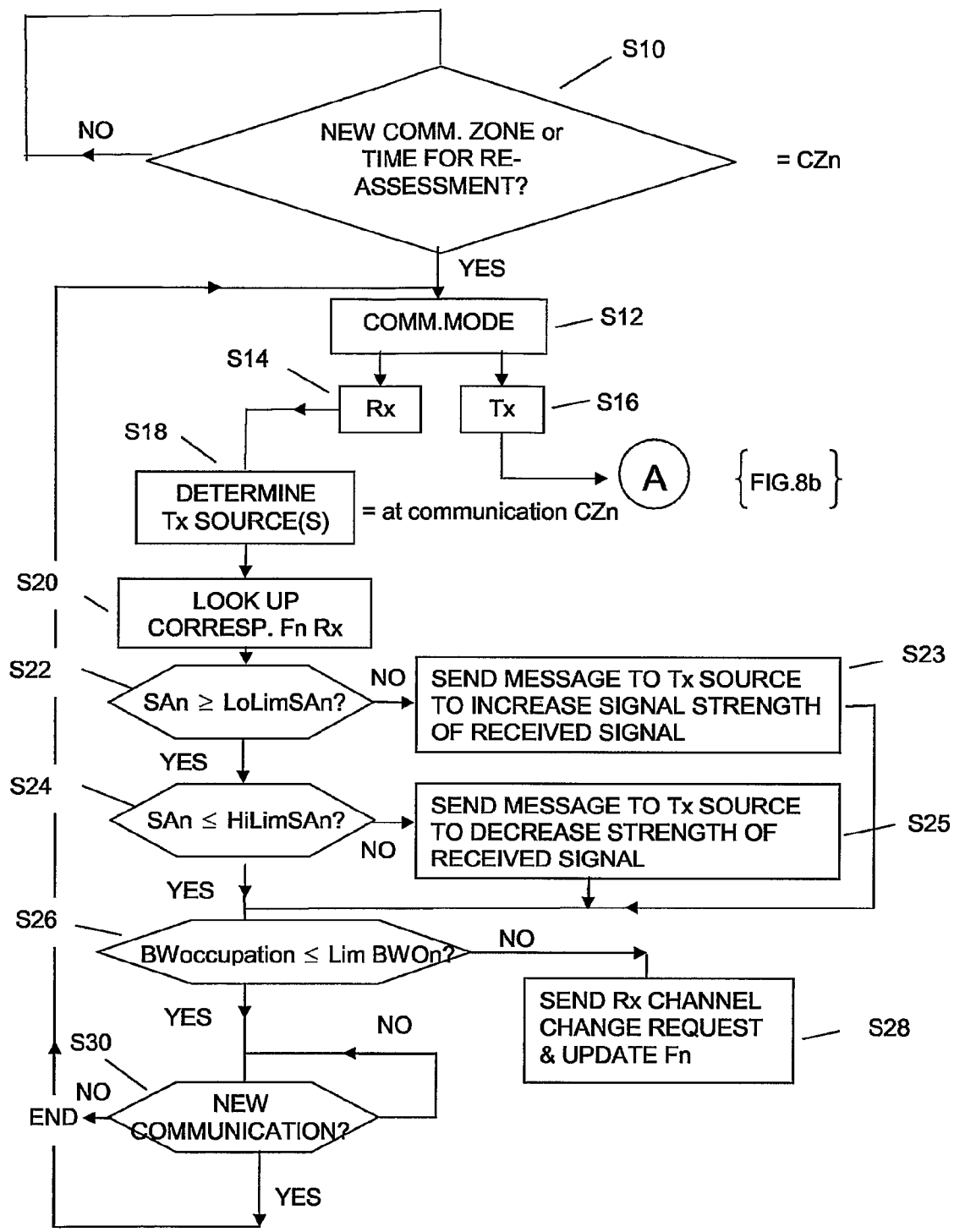
FIG. 8a is a flow chart showing steps in a communications management procedure utilising the communication parameter attributes in accordance with the invention, notably at the level of a receiving party.
Figure 8B:
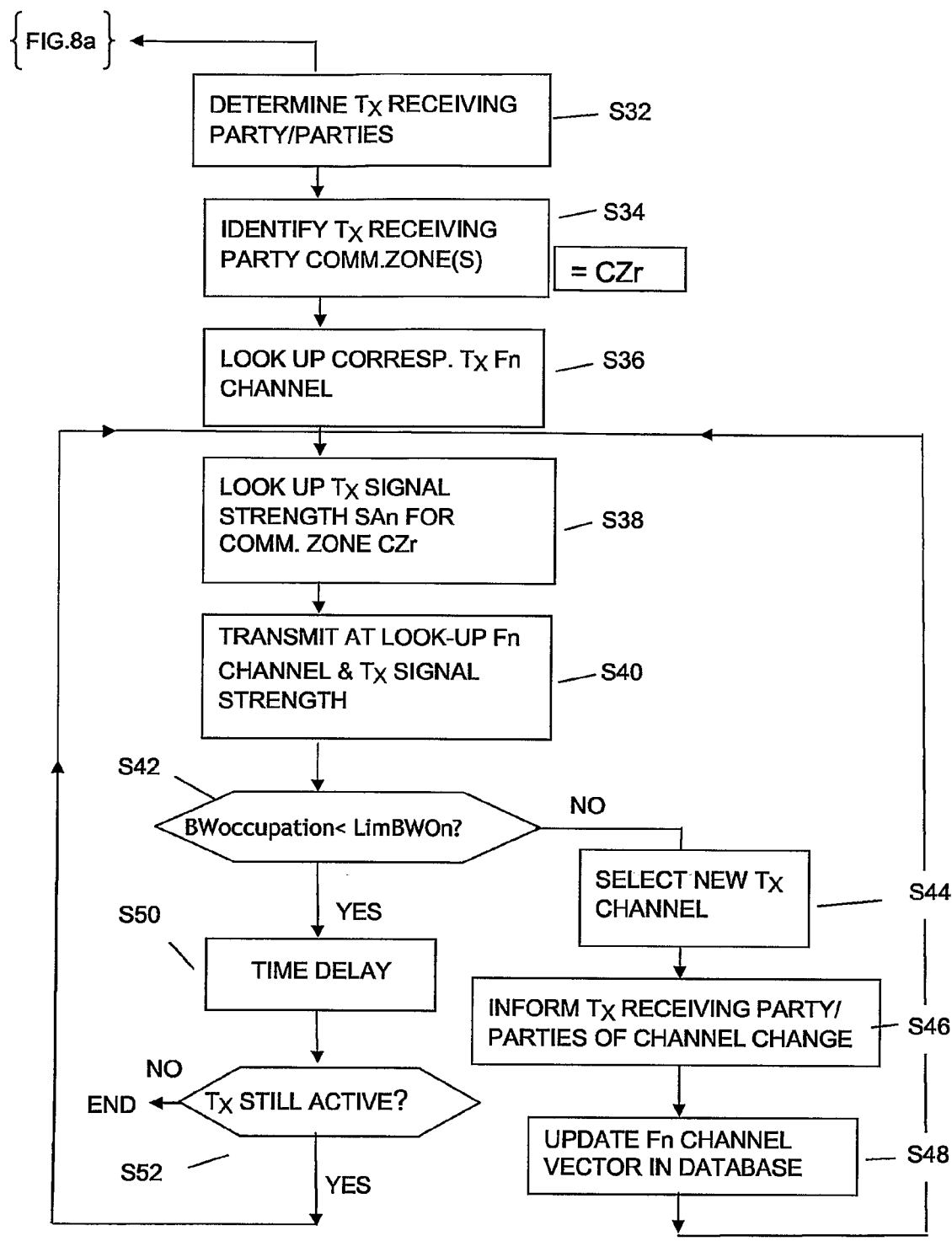
FIG. 8b is a continuation of the flow chart of FIG. 8b, showing in particular a communications management procedure utilising the communication parameter attributes in accordance with the invention, notably at the level of a transmitting party.

The communication parameter attributes (abbreviation CPAV, section 6a of attribute data space) concern data for establishing and maintaining wireless communication links between communicating entities on and off the worksite, as explained further with reference to FIGS. 8a and 8b. The communication parameter attributes used in the embodiment are:
- a frequency or channel parameter set C01 for a given wireless communication link, such as a wireless local area network (WLAN), as a function of the location of the receiving and/or transmitting parties, as well as other factors, such as bandwidth occupation, reception conditions, types of communicating entities concerned, etc.;
- a signal strength indicator parameter set C02, which indicates a signal strength to use for transmission according to range/reception conditions, if needs be as a function of channel/frequency; and
- a bandwidth capacity parameter set C03, which indicates the bandwidth capacity of a given communication frequency or channel, and optionally a bandwidth saturation threshold limit. This information enables a receiving or transmitting party to determine whether the carrier frequency or channel is close to saturation in terms of its maximum data traffic capacity, so as to switch to a less occupied frequency or channel to avoid a breakdown and to spread the load on the wireless transmission spectrum used.

If data communication security provisions are called for, further communication parameters can be stored and managed as above for corresponding parameters in respect of security, privacy, ot integrity protection. For the instance, communication attribute parameters in respect of data communication security can comprise one or any combination of:
- encryption codes or keys,
- passwords, logins, etc.,
- parameters for establishing virtual private networks, etc.

The communication attributes can also comprise information in connection with messaging formats and communication protocols to use, possibly taking into under different conditions and sending/receiving parties.

As for other communication parameters, each of these data communication security parameters can be managed as sets or vectors of values as a function of the type or classification of the communicating entities concerned.

The real-time detected AD parameter values (abbreviation RDAV, section of 6b of the attribute data space) generally concern data gathered on the worksite while work is in progress.

These data are typically acquired by specific sensors on board mobile apparatus that perform contour-modifying tasks, or by sensors that are provided specifically for data acquisition purposes. In the example, the real time detected attribute values are: material (e.g. soil) humidity (F01), ambient air humidity (F02), material (e.g. soil) temperature (F03), ambient air temperature (F04), soil or ground density (F05), chemical composition data of material (F06), physical composition data of material (F07), mechanical characteristic data of material (F08), optical characteristics of the material, e.g. colour, reflectivity (F09), outgassing rate (F10), and type of gas outgassed (F11). The last two parameters can provide valuable information on the soil characteristics (indicating for instance fermentation if an outgassing of methane is detected), or a possible leak in a fluid conduit.

The pre-surveyed AD parameter values (abbreviation PSAV, section 6c of the attribute data space) correspond to information acquired prior to the earthmoving tasks, and which generally indicate characteristics of the worksite on and beneath the surface that are useful to know. In the example, the pre-surveyed attribute data are: soil or ground type (G01), the qualitative land composition according to depth, respectively 0-0.2 meters (G02), 0.2-0.5 meters (G03), and 0.5-1.0 meters (G04) below ground (from the initial contour), to produce cut information, an indication of a buried conduit (GO5) (expressed as a Boolean yes/no), a code indicating the type of buried conduit (G06), an indication of an underground cavity (G07), a code indicating the type of underground cavity (G08), depth data in relation to a buried conduit or underground cavity (G09).

Another attribute parameter used in respect of a buried conduit and/or cavity relates to the exact positioning within a cell (G10) and, if needs be, indications of possible positioning errors or drifts (G11). This parameter can thereby express positional precisions or uncertainties. For instance, the last record of a conduit or cavity may date from a time subsequent to which some local land movement may have occurred, or the records may have been based on error-prone techniques. The position data can then accommodate for this situation. It can also indicate the locations of conduit/cavity boundaries e.g. in terms of height/depth, x, y coordinates within the cell (G12).

The depth data can be referenced with respect to a universal/local height reference level. This reference level can be marked out by sweeping laser beams, ground markers, etc. In the example, the reference level is also one of the attribute data parameters managed for each cell or group of cells. Typically, this parameter value is a numeral expressing a height (positive or negative) of the reference level with respect to actual ground level at that cell (e.g. at the cell's centre) (G13). This numeral is updated at regular intervals so as to continue to provide the correct reference level indication as the actual ground level of the cell changes, e.g. as a function of cut, dig or fill operations carried out.

The soil type parameter value is expressed as a code which uniquely corresponds to one of a set of listed possible soil types, for example clay, fine gravel, earth with chalk, etc. The correspondence between the soil type and the code are stored in a look up table accessible by the entities concerned. The ground composition data can, of course, be extended to cover greater depths as required.

The task attribute values (abbreviation TAV, section 6d of the attribute data space) generally correspond to parameter settings for both the end result of the surface and the machinery for producing that result. In the example, the task attribute values are: indications for dig/cut or fill operations (H01), which can be quantitative and/or qualitative, e.g. an extent indicated with respect to the reference level, the required slope of the surface along the x-axis (H02), the required slope of the surface along the y-axis (H03), the top surface finish required (H04), the type of apparatus (H05) and the type of contour-modifying tool (H06) to be used to conduct the task, and servo control settings (H07) for the apparatus actuators.

The administrative AD parameter values (abbreviation AAV, section 6e of the attribute data space) correspond to a legal or contractual status associated to the land mapped by the elementary cell concerned. In the example, the administrative attribute values are: the land owner (I01), information regarding insurance coverage (I02), the contractor responsible for undertaking the contour-modifying tasks (I03), information for calculating a charge for the contour-modifying tasks (I04), a priority attribution for the tasks (I05), the legal status of the land (I06) (e.g. whether the land concerned is a nature reserve, council property, private property etc.), an indication of a possible toxic hazard associated to the land (I07) (e.g. radioactive waste), and an indication of a possible archaeological interest (I08), etc. All these administrative AD parameter values are expressed in terms of pre-established codes corresponding to listed items stored in look up tables and accessible by the entities concerned. Naturally, for any of the above classes of communication or worksite management attribute values, the list of AD parameters is open and can be modified dynamically to suit circumstances. It will be appreciated that the term "value" used in connection with any attribute parameter (attribute data value) encompasses all possible descriptors as appropriate, these being e.g. numerical, verbal, identification codes, Booleans, etc.

Each data entry for an attribute data parameter value in any of the above categories corresponds to a value inputted into a pre-formatted computer-readable field. Depending on the nature of the attribute data concerned, the entered value can be in the form of: a number, an alpha numerical code value, a Boolean (e.g. yes/no), text, etc. These attribute data values thereby form a set of metadata indexed to a specific cell C.

It will be understood that the attribute data space 6 effectively constitutes a three-dimensional matrix of values, with two of its orthogonal dimensions defining a coordinate plane for locating each cell in direct correspondence with the x-y physical position of those cells. The third, z, dimension (along the height axis of the columns 10) serves to define the different types of communication and worksite management attribute data values to be associated with each cell.

Figure 6:
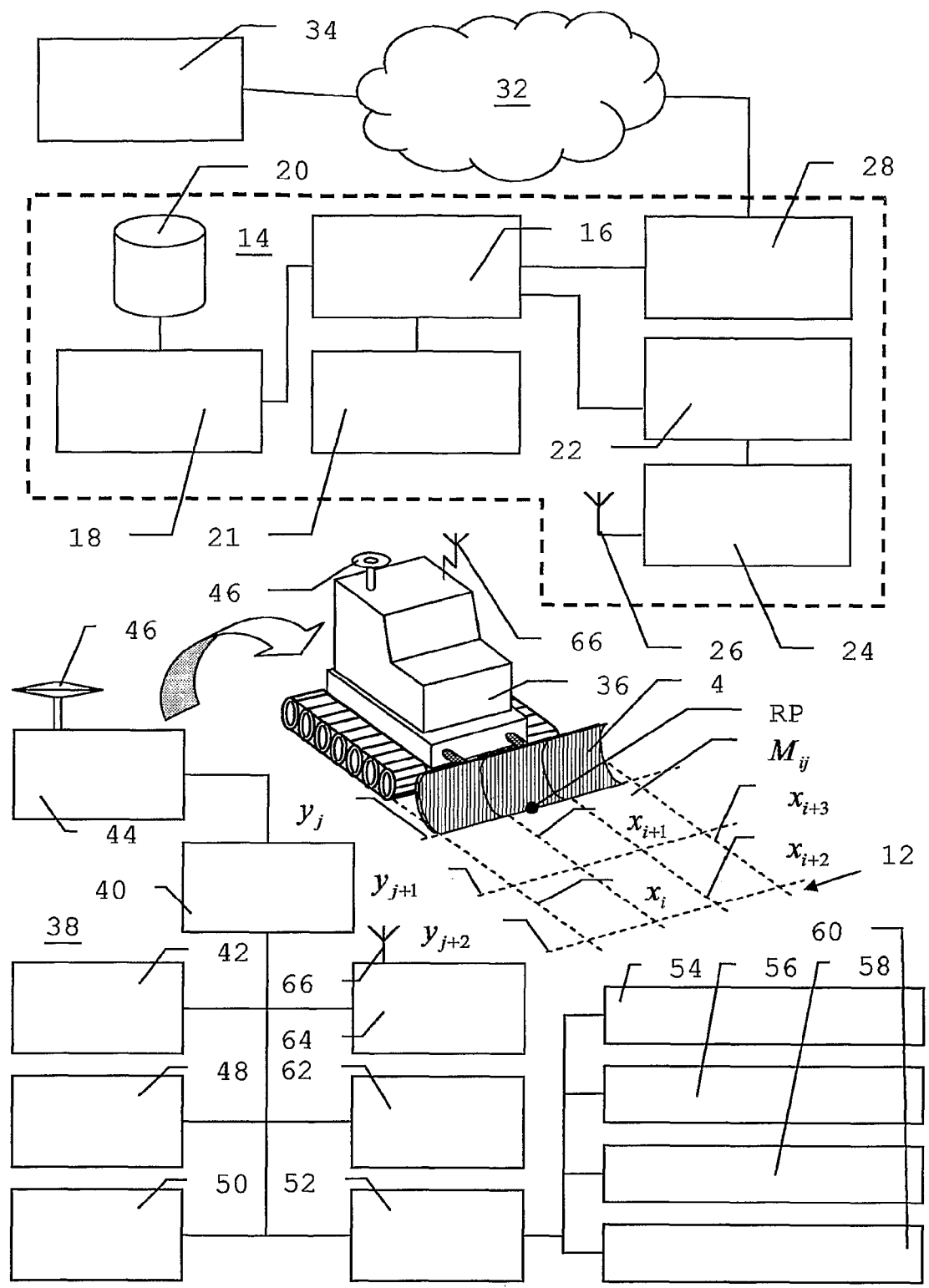
FIG. 6 is a block diagram showing the main functional units that manage and exploit attribute data in accordance with a preferred embodiment of the invention.

FIG. 6 shows in block diagram form how the aforementioned attribute data are managed and exploited during site-modifying tasks on the worksite 12. The management of the attribute data is allocated to an on-site office 14 at which are located the worksite's main intelligence and communications equipment. The activities of the on-site office 14 are centralised at a central management unit 16 which contains the main computer resources. Tasks which are specific to attribute data are decentralised at an attribute data manager unit 18 which is directly associated to an attribute database 20. This database stores dynamically the AD parameter values in the above-mentioned communication and worksite management attribute data space 6.

Generally, when the term "attribute" is used in the description without the qualifier "communication" or "worksite management", it is intended to cover generically either or both of communication and worksite management attributes, as applicable.

The central management unit 16 also cooperates with:

a mobile apparatus displacement manager 21 which: keeps track in real-time of the positions of each item of mobile apparatus on the worksite 12, determines the area to be worked in by the remotely guided mobile apparatus as a function of high-level commands received through the central management unit 16, and generally regulates the traffic throughout the worksite to avoid collisions and congestions;

an on-site communications manager 22 which handles high and low level tasks in connection with communications (message formatting, addresses, transmission protocols, frequencies, routing, etc.) for all the communicating entities on the site, whether it be between the communicating entities and the on-site office, or between the communicating entities themselves. To this end, the on-site communications manager 22 is associated to a communications interface 24 which contains the baseband and radio layers for wireless communication via an antenna 26 with the on-site communicating entities. It also:

manages the read and write operations of the attribute database 20 as regards the communication parameter attributes, ensuring that these are updated as and when required; and communicates the updated communication attributes to all entities on and off the worksite concerned. As explained further, decisions to update some of the communication attributes, e.g. for new frequencies or signal strengths to use, etc., can come directly from entities on the field. The communications manager 22 receives this update data through messages sent by those entities, and acts by entering the updated data into the appropriate fields of the attribute database 20; and an off-site communications interface unit 28 which centralises all communications between the worksite and its outside environment using a number of different communication channels: installed telephone lines, radiolink via an antenna 30, and the Internet 32.

In the illustrated example, the off-site communications interface 28 uses the Internet to communicate with off-site offices 34. The off-site and on-site offices can thereby exchange data virtually in real time, e.g. for transferring commands, interrogating and updating databases, sharing computational tasks etc. Security measures such a virtual private network (VPN) tunnelling can be implemented as appropriate.

The hardware implementation of the on-site office 14 to acquire, process and store the attribute data can be based on standard processor, memory and communications techniques.

The figure shows a bulldozer 36 as an example of a mobile apparatus which exploits attribute data in accordance with the invention. To this end, the bulldozer is equipped with onboard hardware and software (generally designated by reference 38) for communicating with the on-site office 14 and managing the attribute data at its local level. As will be explained in more detail further, the bulldozer 36 is provided with an individualised attribute data set that is limited to its specific requirements at a current time as concerns both its geographical location and the type of attribute data it specifically requires.

The onboard hardware and software 38 relevant for exploiting the attribute data comprise:

- an onboard central processing unit (CPU) 40 which centralises all the functional units of the bulldozer 36, associated with internal and external memories including a random access memory (RAM) 42 in which the local AD parameter values are stored;
- a global positioning by satellite (GPS) unit 44 associated with a satellite antenna 46 for acquiring the bulldozer's real-time position, speed and direction data. The GPS unit is pre-calibrated with a positional offset so that the positional coordinates acquired correspond to a fixed reference at the level of the contour-modifying tool used (in this case the blade 4). In the figure, the reference is a point RP located at the bottom of the blade 4, centrally along the width dimension of the latter. The reference position is established for a predetermined deployment configuration of the hydraulic rams operating the blade, for instance corresponding to the level where the blade makes contact with the ground when the bulldozer is on a level surface. Positional changes of the reference point caused by movements of the ram (i.e. displacement of the blade relative to the bulldozer itself) can be taken into account from the hydraulic ram command data, so that the absolute position of the reference point RP can be determined all times to within the positional accuracy provided by the GPS system;
- a cell locator unit 48 cooperating with the GPS units 44 to identify the specific cell C of the mapped worksite at which the reference point RP is located. The correspondence between GPS coordinates and mapped cells is performed by standard techniques e.g. based on look-up tables or algorithms;
- a servo control unit 50 for controlling the motion of the blade 4 in response to received contour-modifying commands. This unit also sends the required relative blade position data to allow the GPS unit 44 to determine the appropriate offset, as explained above;
- a sensor management unit 52 which interfaces with all the different sensors that equip the bulldozer. Among these sensors are those which provide at least some of the communication and real-time detected attribute values (sections 6a and 6b of the attribute data space 6). Sensors on board the bulldozer 36 for providing real-time detected attribute values are in this example: an ambient air humidity sensor 54, a soil temperature sensor 56, a soil humidity sensor 58 and an outgassing rate sensor 60. Other types of sensors can be provided as required. Note that the bulldozer also delivers ground density attribute data, which it acquires indirectly from hydraulic pressure and ram response data at the level of the servo management unit 52;
- a local attribute data manager 62 cooperating directly with the onboard CPU 40 and specifically assigned the tasks relative to the handling, distributing and updating of attribute data at local level. The items of attribute data for current or imminent use are formatted in that unit and stored in the RAM 42 of the onboard CPU; and
- an onboard communications interface unit 64 which manages all exchanges of data with the outside environment on the basis of the appropriate and current communication attribute parameters C01 to C03, notably with other mobile apparatus and with the on-site office, through the wireless local area network (WLAN) using an antenna 66.

The communications attribute parameters serve to optimise data exchanges, notably the over wireless connections described above. Typically, they can be a function of location-dependent factors and/or time-dependent factors, and/or usage-dependent factors.

In the embodiment, the communications attribute used are:

- the radio frequency, corresponding to a channel, to use for communicating from or to the cell C in question. This may be expressed as a list of frequencies where each item corresponds to a type of apparatus or vehicle concerned;
- the signal strength to use for communicating from or to a particular cell or group of cells forming a communication zone, as explained further. For transmission from the cell C, this may be expressed as a table indicating the signal strength to use for different distances or locations to reach; and
- the bandwidth occupation for different frequencies or channels at the cell C or communication zone considered.

If needs be, the communication attribute can also comprise a signal-to-noise (SNR) indicator and one or a number of data security parameters (codes, keys, etc.) as mentioned above.

All of these communication attributes are dynamic and updatable, being a function not only of geographical position, but also susceptible of varying in time as a function of current and evolving conditions, such as: the temporary presence of structures susceptible of causing radio interference, the instant density and type of radio communicating devices in the vicinity of the cell(s) considered, atmospheric conditions, the local and current data security requirements, etc.

At any time, a communications attribute can be changed or updated at the level of a cell or a group of cells, the latter typically occupying an area where communications conditions are considered, to all intents and purposes, to be substantially uniform.

Figure 7:
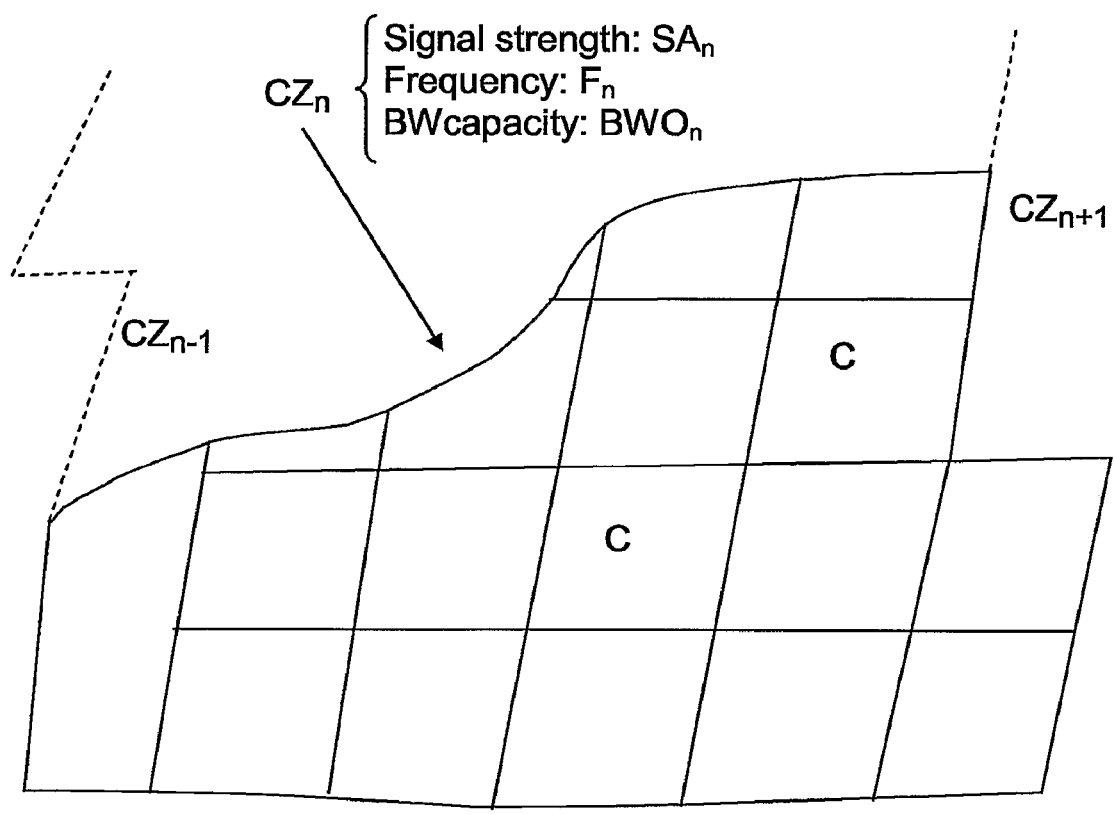
FIG. 7 is a schematic diagram representing part of the worksite divided into communication zones for managing wireless communications.

FIG. 7 illustrates a portion of the worksite which encompasses three communication zones CZn−1, CZn and CZn+1. Each communication zone (generically designated CZ) has a contour surrounding a group of elementary cells C, for which the communications attributes are considered to be common. In the case of communication zone CZn, three variable communication attribute values—or sets of values—are specified as follows: SAn for the signal strength (dB) to use for transmission, Fn for the transmission frequency or channel, and BWOn for the bandwidth occupation, where the subscript n identifies communication zone CZn. Each of those attributes—and possibly data security communication attributes—takes the form of a vector whose components specify respective values for each sub-range or slice of the communication parameter considered.

For the signal strength attribute, the vector SAn is a set of k values SA1n to SAkn, each specifying a signal strength value to use for a specified receiving point on or off the site, and/or a specific type of apparatus which is to receive the signal.

For each frequency/channel attribute, the vector Fn is a set of p transmit and/or receive frequencies or channels, F1n to Fpn, each corresponding to a carrier frequency to use as a function of: the class of transmitting apparatus (moving vehicle, ground sensor unit, etc.), the class of receiving apparatus, and if needs be the communication zone where the receiving point(s) is/are located.

For each bandwidth capacity attribute, the vector BWOn is a set of q values, each corresponding to the limit of signal traffic at a respective communication channel active in communication zone CZn. A BWOn value can express the current (absolute) capacity and a saturation limit directly. The latter can be expressed in terms of a percentage of, or ratio to, the absolute data traffic capacity of carrier frequency/channel in question. Typically, where wireless communication links are established according to a time sharing/division technique, e.g. by time slot allocation, the BWOn value can be expressed in terms of the total number or density of time slots utilised, or by the number of free time slots.

The values stored in the database 20 each of the three vectors SAn, Fn and BWOn are updated and evolve in real time as required.

The block diagram of FIGS. 8a and 8b illustrates an example in which an item of roving apparatus not only uses the communication attributes to establish and maintain its communications links, but also cooperates in making their values evolve to adapt to and suit instant communication conditions.

Starting with FIG. 8a, a roving apparatus periodically checks whether it has entered a new communication zone (step S10) or the expiry of a predefined count-down time setting an interval for re-assessment of a communication attribute parameter. The new communication zone can be identified directly on the basis of the cell(s) in which the apparatus is present, the database recording the cells forming each communication zone. Alternatively, the different communication zones can be marked out by beacons, laser lines, or other detectable boundaries to which the roving apparatus is receptive.

In this way, the roving apparatus knows at all times in which communication zone it is present during its displacement. In the example, the apparatus happens to be in communication zone CZn.

For each communication event, the apparatus enters a communication mode (step S12), which is divided into a reception (Rx) mode and a transmission (Tx) mode (steps S14 and S16 respectively).

In reception mode, the apparatus' radio receiver automatically scans a set of communications channels to detect incoming signals. To this end, it initially determines the sources that can potentially send data to its onboard equipment, i.e. the possible transmission sources (step S18). For each of those sources, it refers to its onboard memory or consults the external database 20 to look up the current value of the transmission channel used by that source (step S20). The channel can additionally be specified for the type of receiving apparatus and for the communication zone in which that receiving apparatus is located.

The procedure of steps S18 and S20 is optional, but helps to narrow down the number channels to scan. In a variant, the procedure can skip steps S18 and S20 and systematically scan all channels used on and off the worksite for communicating to/from the roving apparatus in question.

When a communication is to be established with an identified sending part, and involves a specific form of data security, messaging format, or data transmission protocol, the receiving party accesses the corresponding communication attribute parameters accordingly, so as to adjust to the appropriate receive/decoding parameters.

During reception, the apparatus's radio receiver assesses the signal strength SAn of a received signal against a lower limit threshold LoLimSAn (step S22).

If the signal strength (modulation or carrier) does not exceed the prescribed threshold LoLimSAn, then the apparatus' radio sends a message requesting the signal strength to be increased (step S23), notably for the communication attribute entry indexed to the current communication zone CZn as the receiving zone. The request can simply be a command to raise the level by a determined unit quantity, or it can further include an indication of the amount of increase of signal strength. The message is relayed in real time both to the database 20 and to the radio currently transmitting to the apparatus' radio receiver. Accordingly, the currently transmitting radio can instantly raise its signal strength as required. Should this not be sufficient, a channel change or another suited action such as the introduction of a relaying device can be requested (not indicated in the flow chart).

The received signal strength SAn is also compared to an upper limit threshold HiLimSAn (step S24). If the assessed signal strength is above that threshold, then the apparatus' radio sends a message requesting the signal strength to be decreased (step S25), notably for the communication attribute entry indexed to the current communication zone CZn as the receiving zone. The request can simply be a command to decrease the level by a determined unit quantity, or it can further include an indication of the amount of decrease of signal strength. The message is relayed in real time both to the database 20 and to the radio currently transmitting to the apparatus' radio receiver.

Steps S22 to S25 can be performed during scanning of the frequency channels, where the carrier frequency of each channel is compared for signal strength against a common or respective threshold. In this way, many updates of SAn can be made, covering scanned carrier frequencies/channels not directly concerned by the apparatus. Alternatively, it can be performed just for the active communication channel over which data is received, after the scanning. In the latter case, the signal strength can be the modulation of the information-carrying signal instead or in addition to the carrier signal strength.

Any other communicating apparatus can refer to the updated signal strength indicator parameter, for the boundary conditions concerned, to ensure optimum signal strength. In particular, these measures ensure that the signal strengths can be kept to reasonable values, and thus minimise electromagnetic pollution and save on transmission energy.

A similar procedure can be applied for a signal-to-noise ratio of the signal, either in addition to or instead of the procedure for the signal strength. If the signal-to-noise ratio (SNR) is considered, the analogue to step S22 would be to consider whether the current detected SNR is above a limit threshold. If it is below that SNR threshold, then the procedure can entail sending a message to increase the signal strength, as for step S23, or to switch to another carrier or channel.

Proceeding from step S23 or S25, as the case may be, the apparatus' radio receiver determines the amount of free bandwidth for the channel currently used for the communication. This parameter is based on the maximum bandwidth that can be supported by a communication link, in this case the carrier or channel, and effectively indicates the proportion of that maximum bandwidth used by all resources active in the reception area. The bandwidth occupation can be measured using standard techniques, e.g. from the multiplex utilisation parameters or the signal spectrum. In the example, the bandwidth occupation in question is considered for the receiving communication zone CZn, the bandwidth occupation at the transmitting communication zone being determined independently by the transmitting apparatus. If the bandwidth occupation is equal to or exceeds a predetermined min saturation threshold LimBWOn provided by the bandwidth communication attribute (step S26), then the receiving apparatus' radio sends a message requesting a change of transmission channel and an update of the frequency channel to a new, less occupied, channel (step S28). As for the signal strength update, this request is relayed in real time both to the database 20 and to the radio transmitting currently to the apparatus radio receiver. The currently transmitting radio can instantly change channel to an agreed new channel. Any other communicating apparatus can refer to the updated channel information for future transmissions, under corresponding boundary conditions, until a new update is produced.

The receiving apparatus constantly monitors the signal reception to detect the normal ending of a communication and the onset of a new communication (step S30). When a new signal communication is to be started, the procedure loops back to the initial communication mode (step S12) to start again for that new communication. If that new communication is in the receive mode, the procedure described is thereby repeated.

The procedure performed by the apparatus' radio for case of a signal transmission (Tx) mode from the latter is indicated by the portion of the flow chart produced in FIG. 8*b* (cf. encircled A bridging FIGS. 8*a* and 8*b*).

For a signal transmission, the apparatus in communication zone CZn (in this case the transmitting apparatus) first determines the receiving party/parties (also referred to as the recipient(s)) for communication (step S32). For each identified recipient, it accesses the database 20 to determine that recipient's current location in terms of the corresponding communication zone CZ where it is located (step S34). In the example, the latter is designated communication zone CZr.

Next, the transmitting apparatus accesses a look up table in the database 20, or within its memory, containing the frequency parameters, to determine the current communication channel to use for communicating with the selected (receiving) apparatus at communication zone CZr (step S36). Then, it looks up, from the same data source, the current signal strength value to use for communicating to the receiving apparatus (step S38). Note that the channel and signal strength values can be set as result of steps S22 and S23 (signal strength too low) or of steps S24 and S25 (signal strength too high), or of step S26 (bandwidth saturation condition) from an earlier communication link.

If needs be, it can look up the required data security codes and other information among the corresponding communication attributes provided to this effect, for the specifics of the communication to be established (characteristics of the receiving parties, type of information to be transmitted, etc.).

Likewise, when a communication involves a specific form of data security, messaging format, or data transmission protocol, the receiving party accesses the corresponding communication attribute parameters accordingly, so as to adjust to the appropriate receive/decoding parameters.

The transmission is then effected at the frequency (channel) and signal level currently given by the look-up tables (step S40).

At regular intervals, the transmitting apparatus checks the bandwidth occupation of the channel currently used, notably to ascertain that it is within the maximum threshold value LimBWOn (step S42), as explained above for the receiving mode (cf. step S26).

If the detected bandwidth occupation for the current channel exceeds that threshold, e.g. owing to relatively large number of transmissions locally already sharing that channel, then the transmitting apparatus chooses a new channel (step S44), sends a message signalling a change of transmission channel, specifying the new channel, to each receiving party (step S46). The message is also sent in real time to the database 20, which updates the channel vector accordingly (step S48). After that last step, the procedure loops back to step S38, where it looks up the signal strength to use for that new transmission frequency.

All the while the bandwidth occupation remains within the limit LimBWOn (step S42), the communications continue on that channel. At regular time intervals fixed by a time delay (step S50), the transmitting party checks whether it is still actively transmitting (step S52). In the affirmative, the procedure loops back to step S38 mentioned above to determine whether it should adjust the transmission signal strength/carrier frequency or channel to a new value entered in the database 20. Note that signal strength can also be updated by a direct request from a receiving apparatus, as explained in connection with steps S24*a* and S24*b*.

If at step S52 it is determined that the transmission is no longer active, the procedure is ended.

Other communication parameters can be monitored and updated in this way to ensure an optimum use of radio resources and an efficient exchange of communication attributes. Attribute tables can be exchanged via servers to assure consistency.

Figure 9:
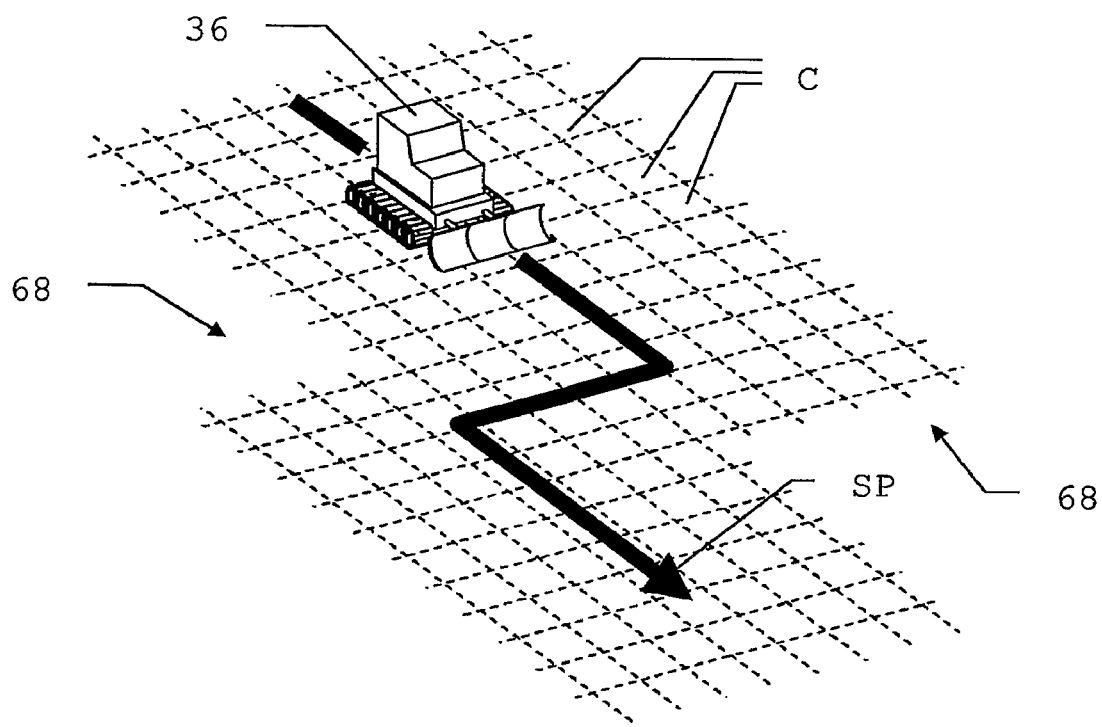
FIG. 9 is a symbolic diagram showing a mobile contour-modifying apparatus and selected elementary cells with their attribute data downloaded into an onboard memory of that apparatus as a function of its planned area of operation.

There shall now be explained by way of an example based on the bulldozer of FIG. 9, how the different attributes discussed above can be used for a specific task. In operation, the bulldozer 36 initially receives instructions for working in a specific area. These instructions are downloaded from the mobile apparatus displacement manager 21 using the wireless local area network, and using the transmission and reception procedures discussed with reference to FIGS. 8*a* and 8*b*. The mobile apparatus displacement manager also uses the issued information to determine the bulldozer's area of operation on the worksite for a determined time window in view of preparing an adapted individualised attribute data set. This information on the area of operation is sent via the central management unit 16 to the attribute data manager 18. In response, the latter prepares the individualised attribute data set, the individualisation taking into account: i) the area of present and future operations, ii) the specific characteristics of the bulldozer and iii) the tasks planned for the bulldozer in that area.

In the above example of the bulldozer (cf. FIG. 6), the site-working tool is more specifically a contour-modifying tool, inasmuch at it changes the height the surface. Some site-modifying tools useable with the present attribute data management method can operate on the site without changing the contour, the tool being e.g. a water sprinkler, a ground marking device, etc.

FIG. 9 illustrates an example of the area of operation 68 for the bulldozer 36 for a given time window, calculated on the basis of a current position of the bulldozer and its scheduled area, as determined by the mobile apparatus displacement manager 21.

In order to economise on transmission bandwidth and on onboard memory space, only the cells C which cover the area of operation 68 are downloaded into the RAM 42 of the bulldozer 36.

For those cells, only the attribute data likely to be required by the bulldozer are incorporated in the individualised attribute data set, again to save on bandwidth and local memory space. Thus, the reduction of information in creating an individualised attribute data set operates on two levels: the topology of the cells (selection of only the pertinent cells) and the types of attribute data (selection of only the pertinent attribute data parameters), corresponding respectively to the x-y plane and the depth dimension of the attribute data space 6 (cf. FIG. 4). The aforementioned time window can be set as a function of one or several parameters among: the capacity of the RAM (a larger time window implies more data to cover more cells), the average speed of displacement, data traffic on the WLAN, etc.

Figure 10:
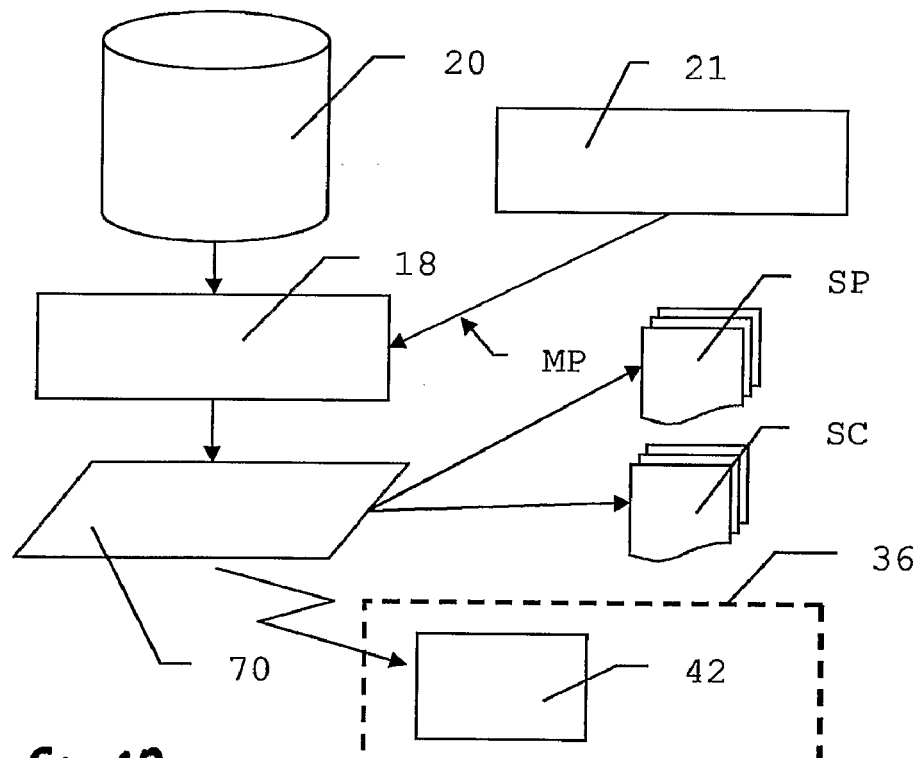
FIG. 10 is a block diagram showing the functional units used to produce an individualised attribute data set for a given mobile apparatus, from an attribute database containing a full attribute data set.

FIG. 10 shows the functional units involved in preparing an individualised attribute data set 70. The attribute data manager 18 is initially programmed with a table listing all mobile apparatuses of the worksite susceptible of exploiting attribute data. For each mobile apparatus, the selected attribute data parameters which it needs to carry on board are recorded. The mobile apparatus displacement manager 21 delivers to the attribute data manager 18 the area data MP covering a determined time window for a designated mobile apparatus. In response, the attribute data manager 18 determines the appropriate cells that adequately cover the corresponding area of operation 68 (cf. FIG. 9). By referring to the above table, it then accesses the attribute database 20 to extract, for each of those cells, the selected AD parameters that are relevant to the mobile apparatus concerned. These selected items of attribute data are arranged and formatted to be readable by the onboard CPU 40, and are mapped in accordance with the topology of the cells which constitute the area of operation 68. The individualised attribute data set 70 thereby comprises selected cells SC and values of selected AD parameters SP.

Note that as the pertinent AD parameters can be variable for a given mobile apparatus depending on the tasks to be conducted and the characteristics of the ground, the selected AD parameters used can be different for different cells.

The thus-compiled individualised attribute data set 70 is incorporated into the user data section of a message according to a predefined protocol and sent to the mobile apparatus by the wireless local area network. Upon receipt by the onboard communications interface 64, the individualised attribute data set 70 is extracted and stored in the onboard RAM 42. The storage is preferably managed according to a memory map following the topology of the area of operation 68. The AD parameter values can then be organised as a z dimension, according to a three-dimensional matrix that corresponds to a section of the attribute data space 6 (cf. FIG. 4), for the AD parameter values present in the individualised data set.

The cell locator unit 48 indicates to the other units the cells at the location and in the immediate vicinity of the blade 4. The attribute data associated to those cells are loaded into the local attribute data manager 62, from which they can be accessed (instead of from the RAM 42) during the execution of the different tasks performed by the mobile apparatus.

Figure 11:
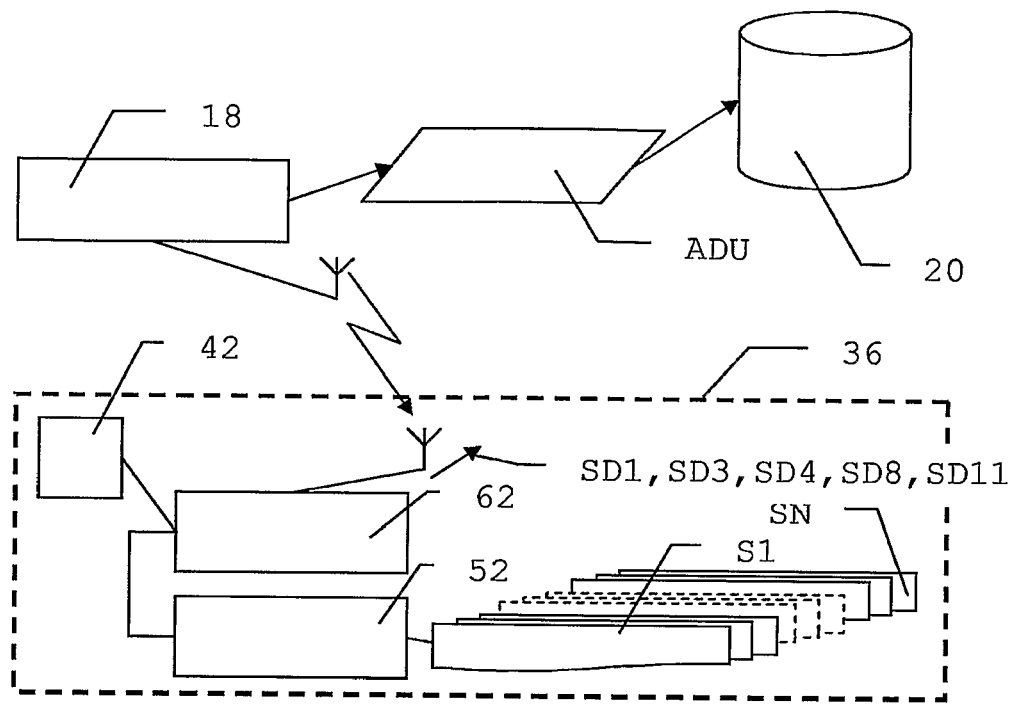
FIG. 11 is a block diagram showing the functional units used to upload attribute data acquired by onboard sensors in a mobile apparatus to a central attribute data manager in accordance with the preferred embodiment of the invention.

In the above, the attribute data are downloaded from the on-site office to the mobile apparatus. There shall now be explained with reference to FIG. 11 how attribute data acquired at a local level by a mobile apparatus can be uploaded to the on-site office 14 for updating the attribute database 20. The figure shows the sensor management unit 52 controlling N different sensors numbered S1 to SN. Among these sensors are some whose acquired data correspond to attribute data AD parameters managed by the attribute data manager 18. If these sensors happen to be, say, sensors numbered 1, 3, 4, 8 and 11 and acquire AD parameter values SD1, SD3, SD4, SD8 and SD11 respectively, then the local attribute data manager 62 will periodically interrogate these sensors and order the uploading of both their data values, and the spatial coordinates at which they were acquired. This information is then uploaded to the on-site attribute data manager 18 through the wireless area network. The on-site attribute data manager identifies these AD parameter values and the AD parameters to which they apply, and enters those values in the field addresses of the corresponding cells of its attribute database 20. These addresses are defined in terms of the cells corresponding to the spatial coordinates and corresponding AD parameters. The interrogation can be conducted at the initiative of the local attribute data manager 62, or in response to a request from either the on-site attribute data manager 18 or another mobile or static unit on the worksite. In this manner, the attribute database 20 is continuously updated for the fields whose attribute data are susceptible of evolving in the course of the tasks being conducted.

The attribute database 20 can also be managed to maintain a history of all attributes and their successive changes/updates as work progresses on the site. This history can serve e.g. to mitigate measurement errors and allow for plausibility checks. It can also provide a source for determining the rate of progress, work efficiency, future improvements in contour modifying procedures or tools, traceability, etc.

Figure 12:
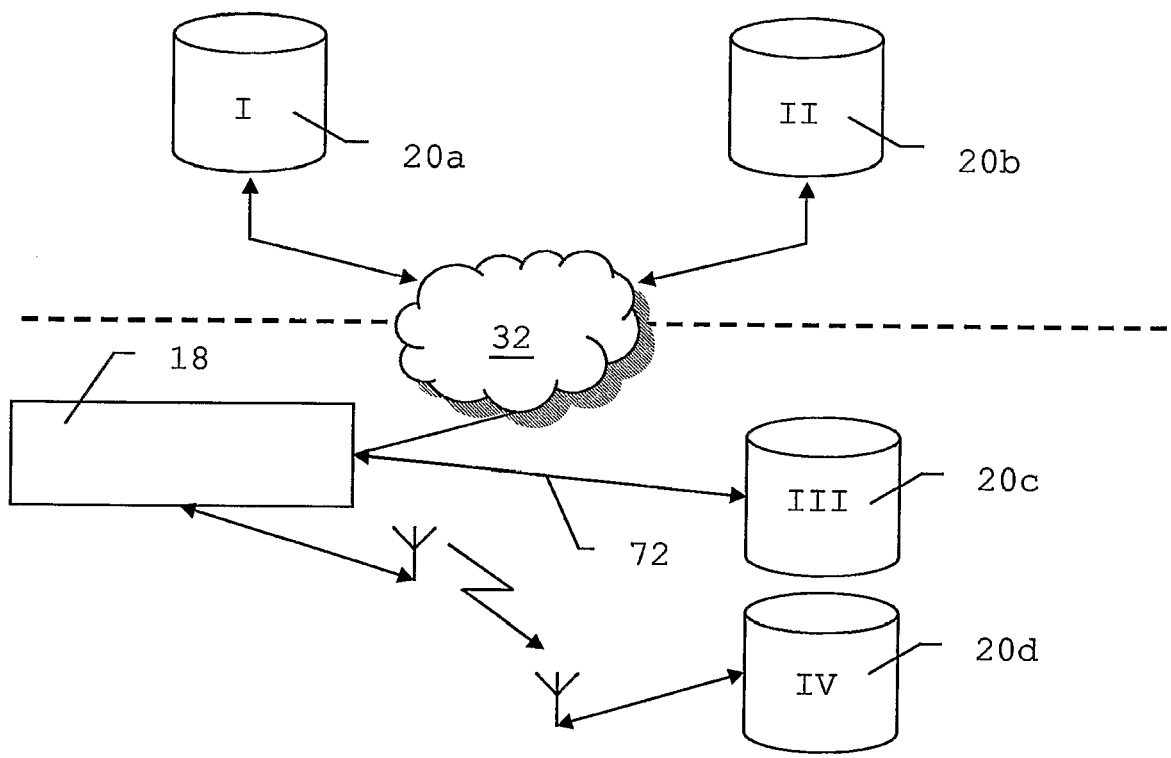
FIG. 12 is a block diagram showing a variant in which the full attribute data set is physically stored over a number of distributed attribute databases.

FIG. 12 shows a variant of the above embodiment which differs by the fact that the entire data set forming the AD parameter values is contained in distributed databases 20*a*-20*d*, as opposed to a single storage entity. The overall operation remains the same, the attribute data manager 18 maintaining a table identifying, for each type of the AD parameters, the specific attribute database where that data is stored. In this manner, the attribute data manager 18 can operate seamlessly with the different databases for entering updated data, preparing individualised attribute data sets 70, etc.

In the illustrated example, the attribute data manager 18 operates with four separate AD parameter databases, identified by respective Roman numerals I-IV. Databases I and II are physically located off-site and are accessible by the attribute data manager 18 through an online server via the Internet 32. This could be the case, for example, if these databases respectively store the pre-surveyed attribute values and the administrative attribute values. Databases III and IV are both located on-site, but are physically separate units. Database III is connected to the attribute data manager 18 via a wire link 72 and is used, for example, to store the task attribute values. Database IV is connected to the attribute data manager by a radio link over the wireless local area network and is used, for example, to store the real-time detected attribute values. With its wireless connection, this database can itself be managed as a mobile unit installed at variable locations on the worksite for optimum communication over the wireless local area network. In this manner, database IV can be conferred with the additional function of serving as a relay and/or communications hub in the local area network.

Figure 13:
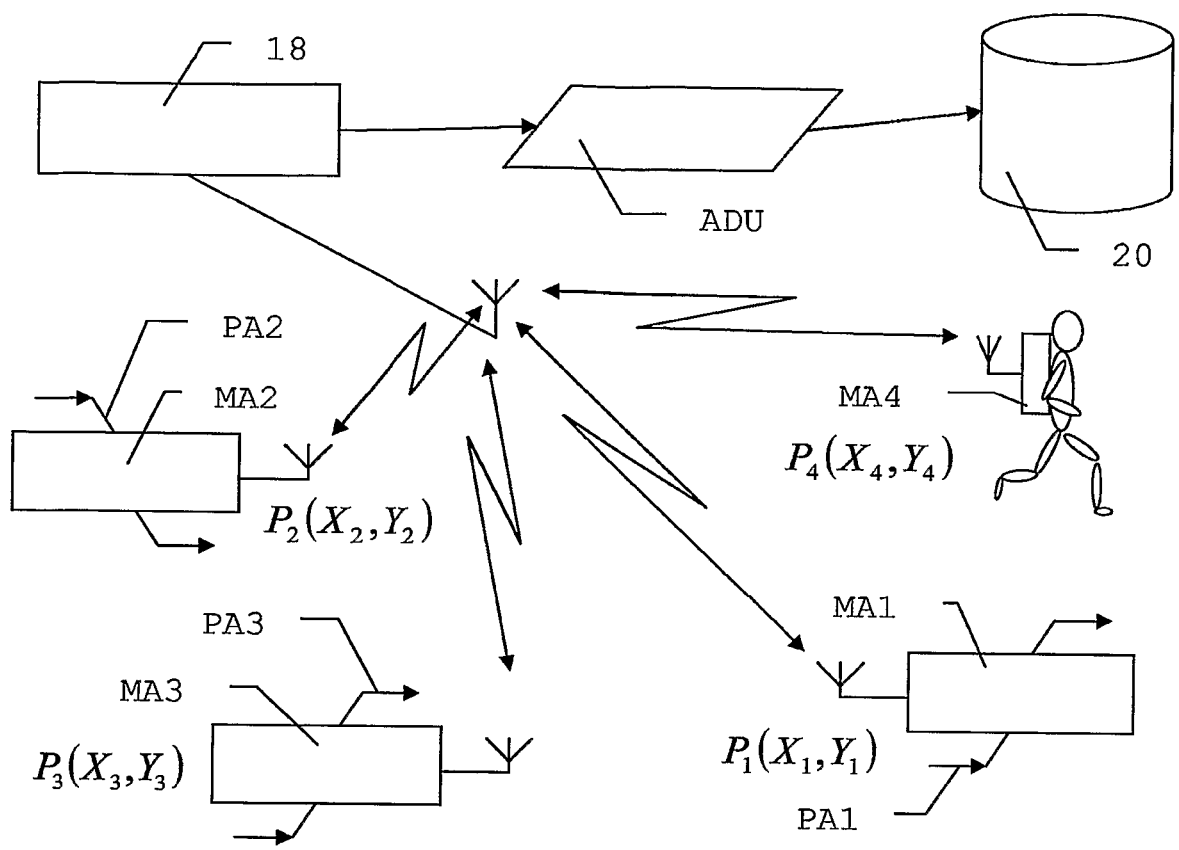
FIG. 13 is a schematic diagram showing how multiple units of mobile apparatus can upload and download attribute data with respect to an attribute data manager in accordance with the preferred embodiment of the invention.

FIG. 13 is a simplified diagram showing multiple items of mobile apparatus MA1-MA4 on the worksite communicating with the attribute data manager 18. The latter is informed in real-time by the mobile apparatus displacement manager 21 (cf. FIG. 6) of the current position (respectively P1-P4) of each mobile apparatus and, where applicable, the programmed area for the latter (respectively PA1-PA3). Note that a mobile apparatus need not necessarily have a programmed area. For instance, the item of mobile apparatus designated MA4 in the figure is a portable sensor unit carried by a human operator, who is given the initiative of his displacement over the worksite. This can be the case for example where the portable sensor unit is a gas detector which analyses chemical characteristics of outgassing emissions. The sensor unit can identify a gas composition, label it using a predetermined code and send at its initiative a message containing the gas composition code and the position coordinates of its point of detection. The latter are determined through a portable GPS unit carried by the operator, or by a total station used in the field of land surveying. The message is sent over the wireless local area network to the attribute data manager 18, where the code is read and entered as the attribute value in the field corresponding to "gas type" (cf. FIG. 5a) for the cell corresponding to that position, as expressed in the message.

The attribute data manager 18 thereby receives and transmits multiple messages from and to the different mobile units, respectively for updating its complete set of attribute data and for downloading to those units the individualised attribute data they currently require, as explained above. In the example, the updated attribute values sent to the attribute data manager 18 are initially buffered, pre-processed and formatted into an update data message ADU sent to the attribute database 20 at short intervals.

It will be understood that the attribute data constitute information that is complementary to the data of the three-dimensional models of the initial and/or target contours. If these models use a grid system to define elementary unit areas with respect to a coordinate system, then it is advantageous to use the same grid system to define the cells C of the attribute data space (cf. FIG. 4). In other words, the elementary unit areas of the three-dimensional model and the cells C can be topologically positioned with a common mesh.

The acquisition of attribute data can be effected using all types of devices and techniques, which can yield the corresponding data value either directly, or by inference. For instance, besides being acquired by the different sensors mentioned in the examples, the attribute data can also be obtained by:
- total stations, i.e. surveying apparatus that determine range and elevation data,
- aerial sensors,
- aerial photography, where techniques such a photograph miscolour analysis, etc. can be used,
- local positioning systems (LPS),
- etc.

In some instances, some filtering of the information may be required to select from the complete set of different gathered data only those that are pertinent to a given recipient for transfer to the latter. The filtering criteria can take into account:
- the part of the site concerned, so that some types of data not necessary for a given portion (identified in terms of cells) can be filtered out, and/or
- the type of apparatus (site modifying tool, personnel, etc.) concerned.

The data filtering means can be positioned at the central office or delocalised to various levels of the worksite, down to the mobile site-modifying apparatus itself.

The attribute data can, of course, differ in terms of type, category, number of items covered and formats attributed to its values, according to applications, the embodiment described simply being given as an example.

The management and storage of the attribute data can be implemented using a variety of hardware and software techniques. The presentation of the attribute data in accordance with the preferred embodiment, based on a three-dimensional attribute data space mapped against a topology of the worksite, is particularly well suited to some three-dimensional spreadsheet programs. Such spreadsheets are conceptually designed to present a depth dimension to a two-dimensional array of cells. In this case, the two-dimensional cell array can be made to correspond to the x-y coordinate plane on which the worksite is mapped, while the depth dimension is reserved for inserting corresponding attribute data parameter values. The depth of the spreadsheet, expressed in unit storage cells, can thereby be made to accommodate a corresponding depth of attribute data fields.

While preferred embodiments have been described, it shall be clear to a person skilled in the art that the invention can be implemented in many other ways as regards hardware, software, choices and classifications of attribute data parameters, etc. while remaining in the scope and spirit of the claims.

What is claimed is:

1. A method of controlling wireless messaging in a worksite area, in which worksite management messages are received by, or sent from, communicating entities operating within said worksite, comprising the steps of:

dividing at least part of said worksite area into elementary cells mapped in correspondence with the topology of said area, or into said cells and determined communication zones;

for a given cell or communication zone of said worksite, establishing at least one communication attribute value pertaining to a parameter of wireless communication to or from said given cell or communication zone;

for a given cell, establishing at least one worksite management attribute value of the worksite for said given cell, said worksite management attribute value pertaining to a parameter other than a said communication attribute parameter;

storing, in a memory, values of said worksite management and communication attributes, each stored attribute value being electronically indexed to the elementary cell, or to the communication zone, for which it was determined;

forming a said worksite management message with an electronically readable content containing at least one worksite management attribute value;

accessing said memory to obtain at least one current communication attribute value in respect of a cell or communication zone to or from which said formed management message is to be communicated by a wireless communication;

establishing a wireless communication to or from said cell or communication zone to send or receive said management message on the basis of said current communication attribute value(s) electronically accessed from said memory; and preparing an individualized dataset specific to an identified site-modifying mobile apparatus, said individualized dataset comprising at least selected worksite management attribute parameter values for the requirements of that identified site-modifying mobile apparatus, wherein said individualized dataset relates only to cells of a region of said worksite where said identified site-modifying apparatus is programmed to be present over a determined time window, the individualized data set taking into account the area of present and future operations for the identified site-modifying apparatus, the specific characteristics of the identified site-modifying apparatus, and the tasks planned for the identified site-modifying apparatus in that area.

2. A method according to claim 1, wherein said memory is provided as a common resource whose contents are accessible to communicating parties exchanging worksite management messages.

3. A method according to claim 1, wherein said at least one communication attribute is at least one of the members of the set of following attributes:
- a communication frequency or channel allocation;
- a signal strength indicator, indicating a signal strength to use;
- a bandwidth capacity indicator;
- a detected signal-to-noise ratio;
- data communication security parameters, such as encryption/decryption codes, keys;
- data messaging format information; and
- data transmission protocol information.

4. A method according to claim 1, comprising the act of indexing in said memory worksite management attributes and communication attributes to a common elementary cell to which they pertain.

5. A method according to claim 1, further comprising the acts of:
- analysing a detected wireless communication signal at a determined elementary cell or communication zone;
- determining, on the basis of said analysis, whether a value of a said communication attribute of that signal is appropriate under current wireless communication conditions; and
- if said value of a said communication attribute is determined not to be appropriate, sending a message to said memory to cause the value of said communication attribute to be updated to an appropriate value, or to adjust the value of another communication parameter.

6. A method according to claim 5, further comprising sending a message directly to the source of said detected wireless signal to cause said source to update the value of said communication attribute to an appropriate value or to adjust the value of another communication parameter.

7. A method according to claim 1, wherein for at least one communication attribute, said memory stores a plurality of values indexed as a function of at least one of the following set:
- a classification of the wireless communication sending party;
- a classification of the wireless communication receiving party;
- a classification of a worksite management attribute to be conveyed in a said worksite management message;
- a location of the wireless communication sending party; and
- a location of the wireless communication receiving party.

8. A method according to claim 1, further comprising the act of establishing or maintaining a radio link at a receiving party, comprising the steps of:
- accessing at least one stored communication attribute value; and
- automatically configuring receiver means of said receiving party on the basis of a said accessed communication attribute value(s).

9. A method according to claim 1, comprising the act of establishing or maintaining a radio link at a transmitting party, comprising the steps of:
- accessing at least one stored communication attribute value; and
- automatically configuring transmitter means of said transmitting party on the basis of a said accessed communication attribute value(s).

10. A method according to claim 1, wherein a said communication attribute is a radio frequency or channel allocation, for exchanging data with a remote resource, said method further comprising the act of automatically updating and using said updated radio frequency or channel allocation as a function of communication conditions.

11. A method according to claim 1, wherein a said communication attribute is signal strength indicator specifying a modulation or carrier signal strength value to use for a transmission in a communication link, said method further comprising the acts of:
- detecting a received signal strength at a receiving party;
- determining whether said received signal strength is below a threshold; and
- if the received signal strength is below the threshold, sending a message by the receiving party to correspondingly update said signal strength indicator value in said memory accessible to communicating parties.

12. A method according to claim 1, wherein a said communication attribute is a bandwidth capacity parameter expressing the bandwidth capacity limit of a given carrier or channel over a given communication link, said method further comprising the acts of:
- determining the current amount of occupied bandwidth of a given communication carrier or channel;
- comparing said current amount of occupied bandwidth with the bandwidth capacity limit, indicated by said bandwidth capacity parameter, for that given communication carrier or channel, to determine if a determined saturation criterion is reached; and
- in the affirmative, sending a message to said memory and/or to communicating parties concerned, requesting to use another carrier or channel.

13. A method according to claim 1, wherein said stored worksite and communication attribute parameter values are organised in a three-dimensional matrix of which the first and second dimensions map the topology of said worksite area and define the locations of said elementary cells or communication zones, and the third dimension corresponds to the set of worksite management and communication attribute parameter(s).

14. A method according to claim 1, wherein a said elementary cell is dimensioned as a function of at least one of the following set:
- the variation in contour at said cell;
- the variation in contour at the immediate vicinity of said cell;
- the rate of variation with respect to position in the value of at least one data to be managed; and
- the type of tool(s) scheduled to operate in the area occupied by said elementary cell.

15. A method according to claim 1, wherein dimensions of elementary cells are variable over said worksite area.

16. A method according to claim 1, wherein communication attribute and/or worksite management attribute values are acquired and communicated and/or stored by mobile apparatus as they are conducting site modifying tasks on the worksite.

17. A method according to claim 1, further comprising the acts of:
- interrogating at least one source of dynamically updatable data, on board mobile apparatus active on said worksite, capable of delivering at least one current attribute parameter value for a communication attribute and/or for a worksite management attribute;
- determining the geographical location at which said current value(s) is/are acquired; and storing said attribute parameter value(s) acquired at said interrogating step, in association with the cell or communication zone corresponding to the said determined geographical location, as an updated communication attribute and/or a worksite management attribute parameter value.

18. A method according to claim 17, wherein a said updated communication attribute and/or worksite management attribute value is sent to a remote data management resource for dynamically updating said stored data values by at least the acts of:
forming a message containing said communication attribute and/or a worksite management attribute parameter value(s) and said geographical location data; and
sending said message to said remote data management resource.

19. A method according to claim 1, further comprising the acts of:
interrogating at least one source of dynamically updatable data on board said mobile apparatus, capable of delivering at least one current communication attribute and/or worksite management attribute parameter value;
determining the geographical location at which said current value(s) is/are acquired; and
associating and locally storing said current communication attribute and/or worksite management attribute parameter value(s) and said geographical location data on board said mobile apparatus.

20. A method according to claim 19, further comprising the act of uploading said communication attribute and/or a worksite management attribute parameter value(s) and said geographical location data from said mobile apparatus to a remote data management resource at a determined updating moment.

21. A method according to claim 1, wherein the value(s) of at least one said communication attribute and/or worksite management is/are dynamically updatable, and acquired and communicated on-the-fly by, and as, a mobile apparatus performs worksite modifying tasks evolves over said worksite area.

22. A method according to claim 1, wherein at least one worksite management attribute relates to physical or chemical material characteristics of said worksite and/or physical or chemical atmospheric characteristics of said worksite.

23. A method according to claim 1, wherein at least one worksite management attribute parameter value is inferred from operating parameters of a site-modifying apparatus operative in said worksite area.

24. A method according to claim 1, wherein at least one worksite management attribute value is established prior to site modifying operations on said worksite and relates to a non-dynamic land characteristic of said worksite.

25. A method according to claim 1, wherein said at least one worksite management attribute value is established prior to site modifying operations on said worksite and relates to operating characteristics of mobile apparatus.

26. A method according to claim 1, wherein said at least one worksite management attribute value is established prior to site modifying operations on said worksite and relates to legal, administrative, or contractual data associated to said worksite.

27. A method according to claim 1, wherein at least one worksite management attribute relates to a reference level, its value for a cell expressing reference level value with respect to which elevation/depth values are established for that cell.

28. A non-transitory storage medium containing an individualised dataset specific to an identified site-modifying mobile apparatus, said individualised dataset being prepared specifically for the execution of the method according claim 1, and comprising selected data elements of said attribute worksite management and/or communication attribute parameters for the specific requirements of that site-modifying mobile apparatus, wherein said individualised dataset relates only to cells of a region of said worksite where said contour-modifying apparatus is programmed to be present over a determined time window.

29. A system for controlling wireless messaging in a worksite area, in which worksite management messages are received by, or sent from, communicating entities operating within said worksite, at least part of said worksite area being divided into elementary cells mapped in correspondence with the topology of said area, or being divided into said cells and determined communication zones, said system comprising:
means for establishing, for a given cell or communication zone of said worksite, at least one communication attribute value pertaining to a parameter of wireless communication to or from said given cell or communication zone;
means for establishing, for a given elementary cell, at least one worksite management attribute value of the worksite for said given cell, said worksite management attribute value pertaining to a parameter other than a said wireless communication parameter;
memory means for storing values of said worksite management and communication attributes, each stored attribute value being electronically indexed to the elementary cell, or to the communication zone, for which it was determined;
means for forming a said worksite management message with an electronically readable content containing at least one worksite management attribute value;
means for accessing said memory to obtain at least one current communication attribute value in respect of a cell or communication zone to or from which said formed management message is to be communicated by a wireless communication; and
means for establishing a wireless communication to or from said cell or communication zone to send or receive said management message on the basis of said current communication attribute value(s) electronically accessed from said memory, and
means for preparing an individualized dataset specific to an identified site-modifying mobile apparatus, said individualized dataset comprising at least selected worksite management attribute parameter values for the requirements of that identified site-modifying mobile apparatus, wherein said individualized dataset relates only to cells of a region of said worksite where said identified site-modifying apparatus is programmed to be present over a determined time window, the individualized data set taking into account the area of present and future operations for the identified site-modifying apparatus, the specific characteristics of the identified site-modifying apparatus, and the tasks planned for the identified site-modifying apparatus in that area.

30. A system according to claim 29, wherein said at least one communication attribute is one of the members of the following set of attributes:
a communication frequency or channel allocation;
a signal strength indicator, indicating a signal strength to use;
a bandwidth capacity indicator;
a detected signal-to-noise ratio;

data communication security parameters, such as encryption/decryption codes, keys;
data messaging format information; and
data transmission protocol information.

31. A system according to claim 29, further comprising:
means for analysing a detected wireless communication signal at a determined elementary cell or communication zone; and
means for determining, on the basis of said analysis, whether a value of a said communication attribute of that signal is appropriate under current wireless communication conditions, said determining means being responsive, if said value of a said communication attribute is determined not to be appropriate, to send a message to said memory to cause the value of said communication attribute to be updated to an appropriate value, or to adjust the value of another communication parameter.

32. A system according to claim 31, further comprising means for sending a message directly to the source of said detected wireless signal to cause said source to update the value of said communication attribute to an appropriate value or to adjust the value of another communication parameter.

33. A system according claim 29, wherein for at least one communication attribute, said memory stores a plurality of values indexed as a function of at least one of the set:
a classification of the wireless communication sending party;
a classification of the wireless communication receiving party;
a classification of a worksite management attribute to be conveyed in a said worksite management message;
a location of the wireless communication sending party; and
a location of the wireless communication receiving party.

34. A system according to claim 29, adapted to establish or maintain a radio link at a receiving party, said system further comprising:
means for accessing at least one stored communication attribute value; and
means for automatically configuring receiver means of said receiving party on the basis of a said accessed communication attribute value(s).

35. A system according to claim 29, adapted to establish or maintain a radio link at a transmitting party, said system further comprising:
means for accessing at least one stored communication attribute value; and
means for automatically configuring transmitter means of said transmitting party on the basis of said accessed communication attribute value(s).

36. A system according to claim 29, wherein a said communication attribute is a radio frequency or channel allocation, for exchanging data with a remote resource, said system comprising means for automatically updating and using said updated radio frequency or channel allocation as a function of communication conditions.

37. A system according claim 29, wherein a said communication attribute is signal strength indicator specifying a modulation or carrier signal strength value to use for a transmission in a communication link, said system further comprising:
means for detecting a received signal strength at a receiving party; and
means for determining whether said received signal strength is below a threshold and, in the affirmative, for sending a message by the receiving party to correspondingly update said signal strength indicator value in said memory accessible to communicating parties.

38. A system according to claim 29, wherein a said communication attribute is a bandwidth capacity parameter expressing the bandwidth capacity limit of a given carrier or channel over a given communication link, said system further comprising:
means for determining the current amount of occupied bandwidth of a given communication carrier or channel; and
means for comparing said current amount of occupied bandwidth with the bandwidth capacity limit, indicated by said bandwidth capacity parameter, for that given communication carrier or channel, to determine if a determined saturation criterion is reached and, in the affirmative, for sending a message to said memory and/or to communicating parties concerned, requesting to use another carrier or channel.

39. A system according to claim 29, further comprising means, aboard mobile apparatus conducting site modifying tasks, adapted to acquire communication attribute and/or worksite management attribute values, and to communicate and/or store said values as said mobile apparatus is conducting site modifying tasks on the worksite.

40. A system according to claim 29, further comprising:
means for interrogating at least one source of dynamically updatable data on board mobile apparatus active on said worksite, said source being capable of delivering at least one current attribute parameter value for a communication attribute and/or for a worksite management attribute;
means for determining the geographical location at which said current value(s) is/are acquired; and
means for storing said attribute parameter value(s) acquired at said interrogating step, in association with the cell corresponding to the said determined geographical location, as an updated communication attribute and/or for a worksite management attribute parameter value.

41. A system according to claim 40, further comprising means for sending said updated communication attribute and/or a worksite management attribute value to a remote data management resource for dynamically updating said stored data values, said system further comprising:
means for forming a message containing said communication attribute and/or a worksite management attribute parameter value(s) and said geographical location data; and
means for sending said message to said remote data management resource.

42. A system according to claim 29, further comprising:
means for interrogating at least one source of dynamically updatable data on board said mobile apparatus, said source being capable of delivering at least one current communication attribute and/or a worksite management attribute parameter value;
means for determining the geographical location at which said current value(s) is/are acquired; and
means for associating and locally storing said current communication attribute and/or a worksite management attribute parameter value(s) and said geographical location data on board said mobile apparatus.

43. A system according to claim 42, further comprising means for uploading said communication attribute and/or a worksite management attribute parameter value(s) and said geographical location data from said mobile apparatus to a remote data management resource at a determined updating moment.

44. A system according to claim 29, wherein the value(s) of at least one said communication attribute and/or a worksite management is/are dynamically updatable, said system comprising means, aboard mobile apparatus, for acquiring and communicating attribute data on-the-fly as said mobile apparatus performs worksite modifying tasks and evolves over said worksite area.

45. A system according to claim 29, further comprising means for acquiring worksite attribute parameter value(s) comprising at least one of the set:
- a total station type of surveying device;
- an aerial view sensor;
- a GPS (global positioning by satellite) device; and
- an LPS (local positioning system).

46. A system according to claim 29, further comprising:
- data filtering means for selecting, from the stored attribute values, those items of information relevant to at least one of the set:
- selected cells;
- selected site-modifying apparatus; and
- selected tasks on said worksite; and
- means for sending said filtered information to targeted recipients.

* * * * *

UNITED STATES PATENT AND TRADEMARK OFFICE
CERTIFICATE OF CORRECTION

| | | |
|---|---|---|
| PATENT NO. | : 8,031,629 B2 | Page 1 of 1 |
| APPLICATION NO. | : 10/598511 | |
| DATED | : November 22, 2011 | |
| INVENTOR(S) | : Peter A. Stegmaier and Klaus Schneider | |

It is certified that error appears in the above-identified patent and that said Letters Patent is hereby corrected as shown below:

Title page
Item (30), Foreign Application Priority Data, change "Mar. 4, 2004 (EP) 0410887" to "Mar. 4, 2004 (EP) 04100887"

Signed and Sealed this

Thirteenth Day of December, 2011

David J. Kappos
*Director of the United States Patent and Trademark Office*